United States Patent
Xue et al.

(10) Patent No.: US 10,772,125 B2
(45) Date of Patent: Sep. 8, 2020

(54) SYSTEMS AND METHODS FOR A SPATIAL LISTEN-BEFORE-TALK PROTOCOL

(71) Applicant: QUALCOMM Incorporated, San Diego, CA (US)

(72) Inventors: Yisheng Xue, San Diego, CA (US); Qingsi Wang, Bellevue, WA (US); Siddhartha Mallik, San Diego, CA (US); Weiliang Zeng, San Diego, CA (US); Ahmed Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/112,444

(22) Filed: Aug. 24, 2018

(65) Prior Publication Data
US 2019/0200385 A1 Jun. 27, 2019

Related U.S. Application Data

(60) Provisional application No. 62/551,182, filed on Aug. 28, 2017.

(51) Int. Cl.
*H04W 74/08* (2009.01)
*H04B 7/0456* (2017.01)
(Continued)

(52) U.S. Cl.
CPC ...... *H04W 74/0808* (2013.01); *H04B 7/0486* (2013.01); *H04B 7/0617* (2013.01);
(Continued)

(58) Field of Classification Search
CPC ......... H04W 74/0808; H04W 72/0473; H04W 74/002; H04W 74/0816; H04B 7/0486; H04B 7/0617
See application file for complete search history.

(56) References Cited

U.S. PATENT DOCUMENTS 7,408,976 B1 * 8/2008 Narasimhan .......... H04L 5/0026
375/148
2005/0195784 A1 9/2005 Freedman et al.
(Continued)

OTHER PUBLICATIONS

International Search Report and Written Opinion—PCT/US2018/048147—ISA/EPO—dated Nov. 20, 2018.

*Primary Examiner* — Duc C Ho
(74) *Attorney, Agent, or Firm* — QUALCOMM Incorporated

(57) ABSTRACT

A method, apparatus, and computer-readable medium at a transmitting network device or a target network device in a listen-before-talk (LBT) session that employ a spatial LBT procedure is disclosed. The spatial LBT procedure takes into account multiple-input multiple-output (MIMO) configuration information in measuring an effective interference. Accordingly, the spatial LBT procedure enables the transmitting network device or the target network device to more accurately measure an interference and make a more accurate decision on whether a channel is clear, and thus improves the system-wide performance. Also, the spatial LBT procedure allows the transmitting network device or the target/receiving network device to adaptively adjust the LBT power detection threshold when the MIMO configuration is not available. This also enables the network devices to more accurately measure interference and make a more accurate decision on whether the channel is clear, especially when advanced MIMO technologies are deployed in 5G or beyond.

22 Claims, 16 Drawing Sheets

(51) Int. Cl.
*H04W 74/00* (2009.01)
*H04B 7/06* (2006.01)
*H04W 72/04* (2009.01)

(52) U.S. Cl.
CPC ..... *H04W 72/0473* (2013.01); *H04W 74/002* (2013.01); *H04W 74/0816* (2013.01)

(56) References Cited

U.S. PATENT DOCUMENTS

| | | |
|---|---|---|
| 2006/0221873 A1 | 10/2006 | Sharony et al. |
| 2011/0150004 A1 | 6/2011 | Denteneer et al. |
| 2014/0307654 A1* | 10/2014 | Kim ............... H04B 7/0617 370/329 |
| 2016/0227571 A1* | 8/2016 | Baek ............... H04W 16/14 |
| 2016/0323915 A1* | 11/2016 | Liu ............... H04W 74/0833 |
| 2017/0331577 A1* | 11/2017 | Parkvall ............. H04L 5/0053 |
| 2018/0054835 A1* | 2/2018 | Fodor ............. H04W 72/1205 |

\* cited by examiner

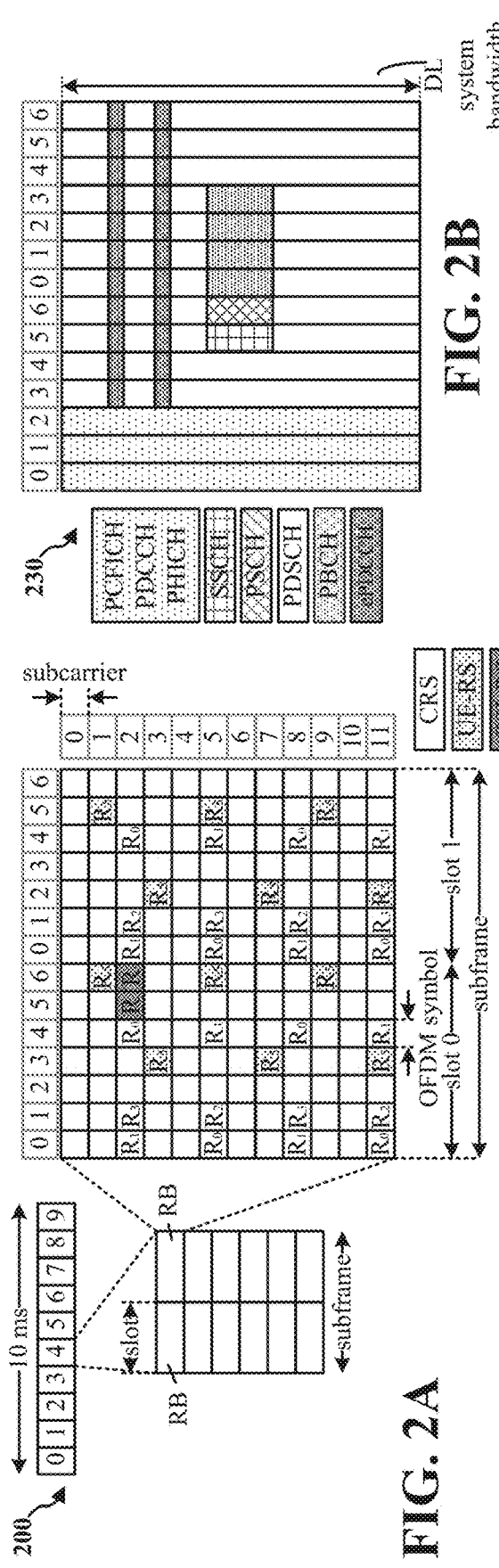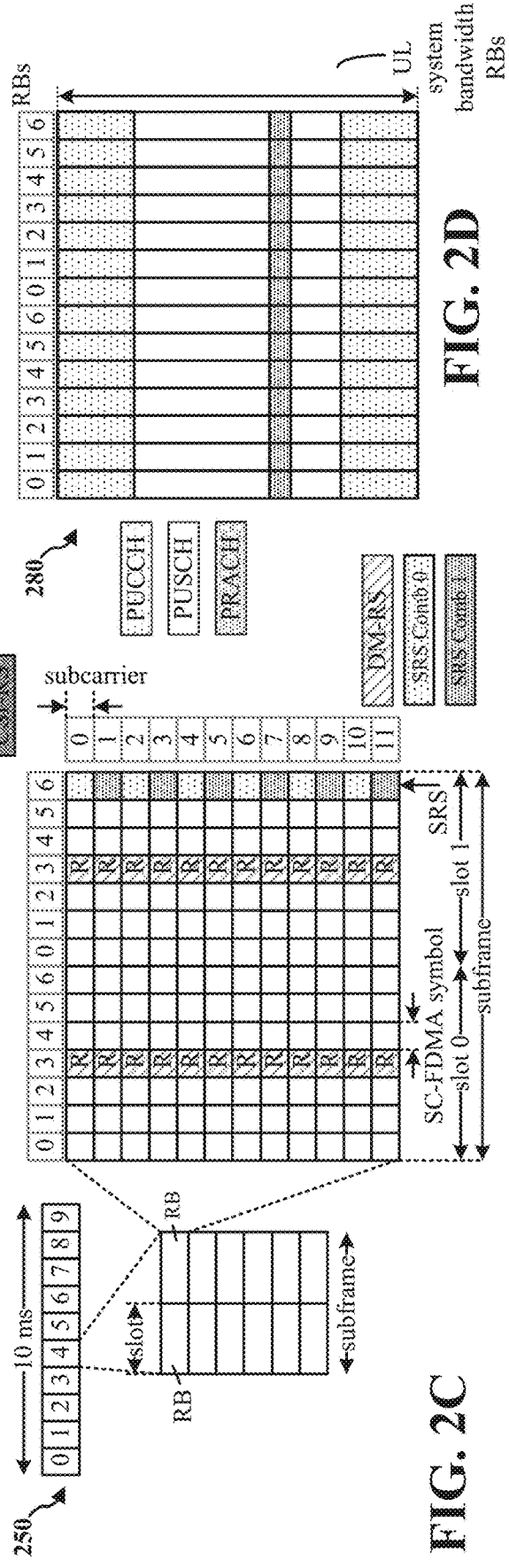
FIG. 2A  FIG. 2B  FIG. 2C  FIG. 2D

SYSTEMS AND METHODS FOR A SPATIAL LISTEN-BEFORE-TALK PROTOCOL

CLAIM OF PRIORITY

This application claims priority to and the benefit of U.S. Provisional Patent Application No. 62/551,182 filed in the United States Patent and Trademark Office on Aug. 28, 2017, the entire content of which is incorporated herein by reference as is fully set forth below in its entirety and for all applicable purposes.

FIELD

The present disclosure relates generally to wireless communication systems, and more particularly, to a spatial listen-before-talk (LBT) protocol.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

However, as the demand for mobile broadband access continues to increase, there exists a need for further improvements in wireless communication technology. These improvements may also be applicable to other multi-access technologies and the telecommunication standards that employ these technologies.

In some wireless communications systems, a medium reservation protocols may be used to allow a wireless device to reserve the wireless channel such that the wireless device can transmit without interference from another device. One such medium reservation method is listen-before-talk (LBT) protocol that may include the exchange of request to send (RTS) signals and clear to send (CTS) signals. The wireless device that has data ready to transmit may first transmit an RTS signal to the intended recipient, after ascertaining the wireless channel is clear to send. The RTS signal may include a duration field that indicates the length of time for which the wireless device wants to reserve the medium. All devices that hear the RTS signal may then refrain from transmitting data for that length of time by setting their network allocation vectors (NAVs). The intended recipient may respond with a CTS signal that includes a duration field, also after ascertaining the wireless channel is clear to send. Any devices that hear the CTS signal but did not hear the RTS signal may also set their NAVs and thereby refrain from interfering with reception at the intended recipient. The transmitting device may transmit data to the intended recipient upon receiving the CTS signal.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

The estimated interference on the wireless medium and the power detection (PD) threshold for sensing a signal on the wireless medium for determining whether a wireless channel is clear or available for RTS-CTS message exchanges and subsequent data transmission can directly impact the performance of the LBT protocol. The conventional omni-directional preamble-based interference measurement and a default PD threshold may not yield optimal performance, when a new MIMO configuration is different from a presumed MIMO configuration. In the present disclosure, the conventional LBT procedure that does not take into account the MIMO configuration information with a fixed interference threshold based on omni-directional energy detection is referred to as a legacy LBT or an omni-directional LBT procedure. The omni-directional LBT procedure may lead to un-satisfactory performance when advanced MIMO technologies are to be deployed in 5G and beyond. This motivates an improved LBT procedure to better exploit the potential benefit of MIMO configuration information.

In the present disclosure, an LBT procedure that takes into account the MIMO configuration information such as a MIMO rank, referred to as a spatial LBT or a spatial LBT procedure, is disclosed. The spatial LBT procedure enables either a transmitting network device or a target/receiving network device to more accurately measure an effective interference and make a more accurate decision on whether a channel is clear, and thus improves the system performance. In addition, the spatial LBT procedure allows the transmitting network device or the target/receiving network device to adaptively adjust the LBT power detection threshold when the MIMO configuration is not available. This enables the network devices to more accurately measure interference and make a more accurate decision on whether the channel is clear, especially when advanced MIMO technologies are deployed in 5G or beyond.

In an aspect of the disclosure, a method, a computer-readable medium, and an apparatus are provided. The apparatus at a transmitter, which may be a base station or a UE, is configured to determine multiple input multiple output (MIMO) configuration information for the transmitting network device, and perform a clear channel assessment (CCA) or an enhanced CCA (eCCA) procedure to determine whether a wireless transmission channel is clear for transmitting data to a target network device, based on the determined MIMO configuration information. The apparatus is further configured to transmit a broadcast message, prior to transmitting data to the target network device, the broadcast message including at least part of the MIMO configuration information, when the CCA or eCCA procedure indicates that the wireless transmission channel is clear.

In another aspect of the disclosure, a method and apparatuses are provided. The apparatus at a receiver or a target network device receives from a transmitting network device a first broadcast message over a wireless transmission channel and determines first multiple input multiple output (MIMO) configuration information of the transmitting network device from the received first broadcast message. The apparatus also performs a clear channel assessment (CCA) or an enhanced CCA (eCCA) procedure to determine whether the wireless transmission channel is clear for transmitting a signal to the transmitting network device, based on the determined MIMO configuration information, and transmit a second broadcast message to the transmitting network device, the second broadcast message including second MIMO configuration information based on the determined first MIMO configuration information, when the first MIMO configuration information is available from the received first broadcast message and when the CCA or eCCA procedure indicates that the wireless transmission channel is clear for transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
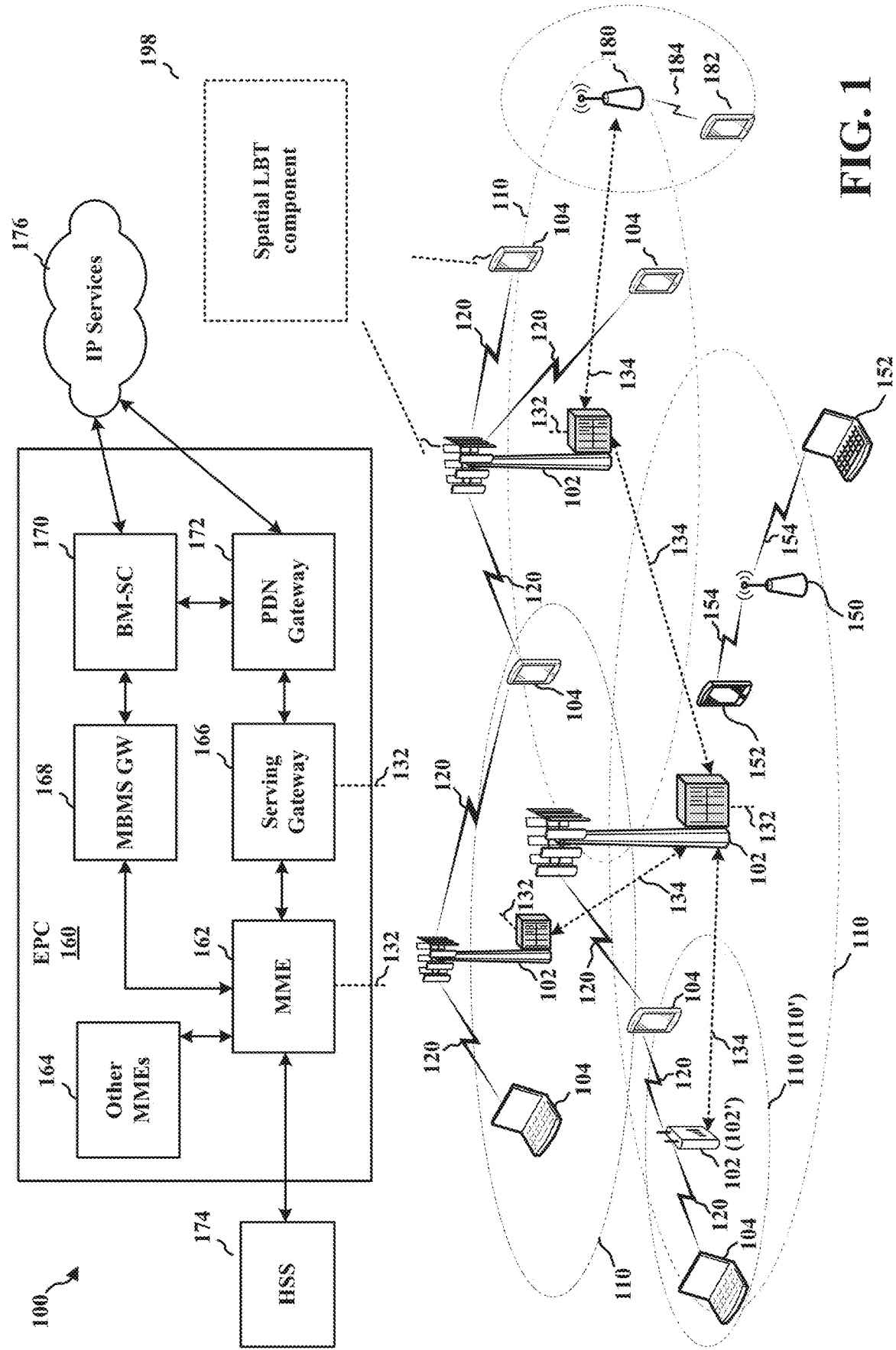
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 102 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies. The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

As noted above, the base stations 102 interfaces with the EPC 160 through backhaul links 132. The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the eNB 102 may be configured to include a spatial LBT component (198) that enables the eNB 102 and the UE 104 to perform an improved LBT procedure. The improved LBT procedure may include taking into account MIMO configuration information in estimating an effective interference. The improved LBT procedure may also include adaptively adjusting an LBT PD threshold based on the MIMO configuration information.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0 and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame and carries a primary synchronization signal (PSS) that is used by a UE to determine subframe timing and a physical layer identity. The secondary synchronization channel (SSCH) is within symbol 5 of slot 0 within subframes 0 and 5 of a frame and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
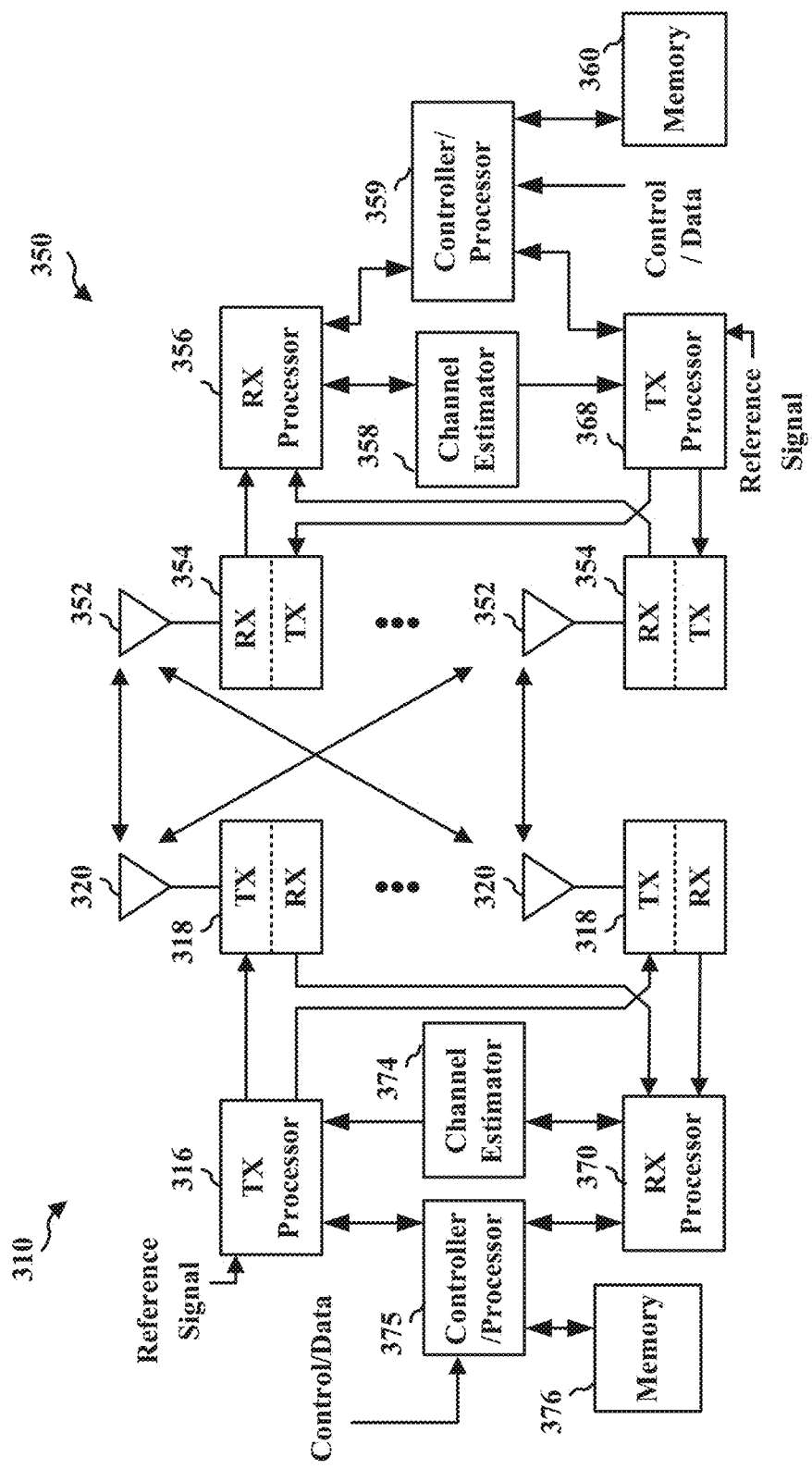
FIG. 3 is a diagram illustrating an example of an evolved Node B (eNB) and user equipment (UE) in an access network.

FIG. 3 is a block diagram of an eNB 310 in communication with a UE 350 in an access network. The eNB 310 and UE 350 may operate as described in connection with FIG. 1 and may communicate according to a set of capabilities which is determined through a capabilities exchange. In the DL, IP packets from the EPC 160 may be provided to a controller/processor 375. The controller/processor 375 implements layer 3 and layer 2 functionalities. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting. The controller/processor 375 provides a PDCP layer functionality associated with header compression/decompression, security (ciphering, deciphering, integrity protection, integrity verification), and handover support functions. The controller/processor 375 also provides an RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also provides a MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionalities.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Listen-Before-Talk (LBT) Protocol

A network may include multiple UEs and base stations. When the UEs and base stations communicate over a shared frequency band, such as the unlicensed frequency band using a time division duplex (TDD) protocol, the UEs and base stations may use the same frequency spectrum band at the same time and cause collisions. A contention-based access protocol such as a Listen-Before-Talk (LBT) protocol may be used to avoid such access collision.

The network devices as described above and illustrated in FIG. 3 may perform a spatial LBT procedure as part of a clear channel assessment (CCA) procedure prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of preamble that indicate use of the channel, with an energy threshold of the preamble. For example, another device may transmit a specific preamble prior to transmitting a data sequence. During an LBT session, if a CCA fails, the device may wait until the channel is clear before attempting to transmit. In some cases, LBT procedures are performed at a layer one (e.g., PHY) entity, whereas transmission scheduling may be performed at a higher layer (e.g., layer two).

Figure 4:
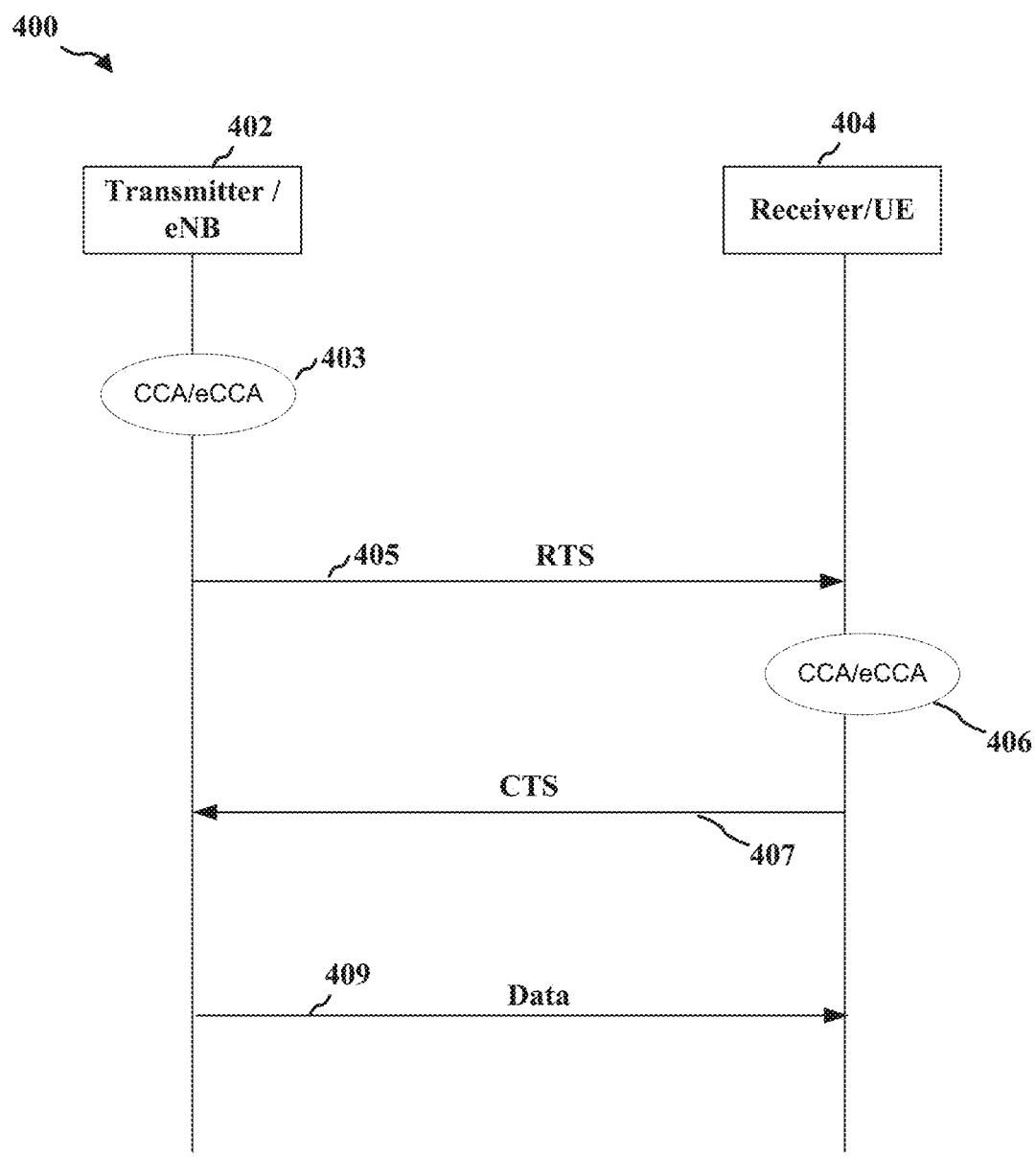
FIG. 4 shows an example message flow diagram for an LBT protocol, according to aspects of the present disclosure.

FIG. 4 illustrates an example message flow diagram 400 for a conventional LBT protocol, according to aspects of the present disclosure. In one aspect, the transmitter 402 may be implemented at an eNB and the receiver 404 implemented at a UE. However, the transmitter 402 may also be implemented at a UE and the receiver implemented at an eNB.

The transmitter 402 may perform at 403 a clear channel assessment (CCA) procedure or an enhanced CCA (eCCA). The CCA or eCCA procedure indicates to the transmitting apparatus whether a channel of a wireless transmission medium such as an unlicensed radio frequency spectrum band is available or in use during a gating interval (also referred to as an LBT radio frame or a CCA radio frame).

After ascertaining through the above CCA or eCCA procedure that the wireless channel is available, the transmitter 402 may reserve the wireless channel through a hand-shake procedure via a (RTS) and clear to send (CTS) message exchange. The transmitter 402 at 405 may transmit an RTS message to the receiver 404 to indicate its desire to reserve a channel for data transmission. In one example embodiment, the base station may transmit an RTS message and then wait during an idle period to receive a CTS message.

In response, the receiver 404 may check its resource and other conditions for receiving data. At 406, the UE/receiver 404 may also perform a CCA/eCCA procedure to sense the wireless channel and determine whether the wireless channel is available for transmission to the transmitter. When the UE/receiver 404 does not detect any frame transmissions that exceed a current interference threshold, after ascertaining the requested wireless channel is available, the receiver 404 may send at 407 a CTS message to the transmitter 402 to allow the data transmission to proceed.

In one example aspect, upon receiving the CTS message, the transmitter 402 may commence data transmission at 409. In another example aspect, upon receiving the CTS message, the base station/transmitter 402 may transmit a header followed by data. Generally, the base station 402 may initiate the RTS/CTS message exchange prior to transmitting the header. The receiver device, e.g., the UE 404, may receive the RTS message and determine if there are frames being transmitted from nodes in another network, e.g., such as base stations associated with a different operator and/or other Wi-Fi nodes.

In case that the channel reservation fails for some reason, the transmitter 402 may start the LBT process again at 403 to perform a CCA or an eCCA procedure. The reasons that the channel reservation failure may occur include that the RTS or CTS message may be lost, the receiver does not have sufficient resources, the wireless medium is busy, etc.

FIG. 4 illustrates an example of CCA protocol where the eNB initiates the LBT process. In another example aspect, it should be understood that the same CCA process may also apply where the UE initiates the LBT process.

CCA and eCCA

CCA is a carrier sense mechanism that may be used in a spectrum sharing, asynchronous wireless communication system such as a wireless local area network (WLAN) system (e.g., WiFi, MuLTEfire, LAA, etc.) or a wireless wide-area network (WWAN). One example CCA is the one defined in the IEEE 802.11-2007 standards as part of the Physical Medium Dependent (PMD) and Physical Layer Convergence Protocol (PLCP) layer. The CCA involves two related functions: carrier sense and energy detection, or CCA-CS and CCA-ED.

Carrier Sense (CCA-CS) refers to the ability of the receiver to detect and decode a reference signal such as a WiFi preamble. From the PLCP header field, the time duration (in us) for which the medium will be occupied can be inferred and when such WiFi preamble is detected the CCA flag is held busy until the end of data transmission.

Energy Detection (CCA-ED) refers to the ability of the receiver to detect energy of a signal in the operating channel and back off data transmission. The energy detection is also referred to as power detection (PD) or LBT power detection. Some other terms may also be used to refer to detection of a signal on a wireless channel, such as preamble energy detection, sequence energy detection, or carrier energy sensing. As used in the present disclosure, these terms may be used interchangeably.

Conventionally, a default LBT PD threshold is defined and used during an LBT session. For example, −72 dMb PD threshold has been the rule of thumb for 3GPP LAA systems. If the in-band signal energy crosses this PD threshold, the wireless channel is held busy until the medium energy is below the PD threshold.

The eCCA procedure, in turn, involves the performance of a random number of N CCA procedures. The UEs and/or base stations may perform the eCCA procedure continuously for as long as they have data to transmit. The UEs and/or base stations may also perform the eCCA procedure continuously during any gap in an uplink or downlink transmission. The UEs and/or base stations may then access a channel after one CCA procedure.

The outcome of the CCA or the eCCA procedure may indicate to the transmitting network device (e.g., UE or base station) whether a channel of a shared radio frequency spectrum band is available or in use during the gating interval. When a CCA or an eCCA procedure indicates that the channel is available (e.g., "clear" for use) during a corresponding LBT radio frame, the transmitting network device may reserve and/or use the channel of the unlicensed radio frequency spectrum band during part or all of the LBT radio frame. When the CCA or the eCCA procedure indicates that the channel is not available (e.g., that the channel is in use or reserved by another wireless network device), the transmitting network device may be prevented from using the channel during the LBT radio frame.

As described above, the performance of a wireless communication system using the LBT protocol is closely related to the ability of the receiver or transmitter to detect energy (or power detection) of an interfering signal in the operating channel and back off data transmission. Conventionally, the PD threshold is set to a default value without consideration of MIMO configuration information. The PD threshold used during an LBT radio frame is also referred to as an LBT PD threshold throughout the present disclosure. A default LBT PD threshold may lead to a diminished performance of the wireless communication system.

Figure 5A:
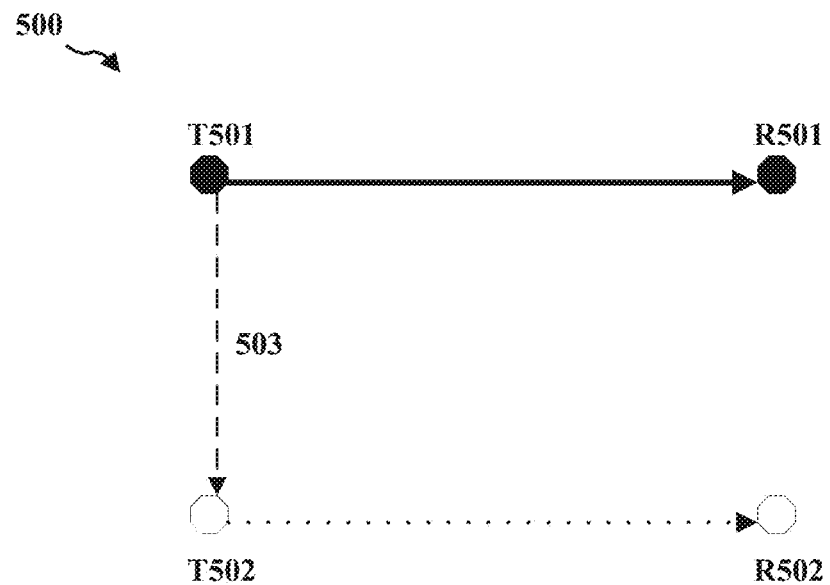
FIG. 5A shows a logical diagram of an LBT mechanism during an LBT session from the perspective of a transmitter, according to aspects of the present disclosure.

FIG. 5A shows a logical diagram 500 of an LBT mechanism during an LBT session from the perspective of a transmitter, according to aspects of the present disclosure. In the logical diagram 500, while the transmitter T501 is transmitting data to receiver R501, the transmitter T502 desires to transmit data to the receiver R502. The transmitter T502 initiates the LBT session by first performing a CCA/eCCA procedure to determine whether the channel is available. Then the transmitter T502 sends an RTS message to the receiver R502 after ascertaining the channel is clear to send via the CCA/eCCA procedure. In a conventional configuration, before sending the RTS message, the transmitter T502 may first check or estimate an omni-directional preamble-based interference measurement 503 from the transmitter T501. Based on the omni-directional preamble-based interference measurement, the transmitter T502 determines whether to respect or honor the network allocation vector (NAV) value of the receiver R502. The NAV value indicates a timeline at a network device indicating when the channel is free or occupied, and for how long the channel will be used. The omni-directional preamble-based interference measurement may be accurate for a transmitter with some presumed configurations such as 2×2 MIMO antennas. The omni-directional preamble-based interference measurement may not be accurate for a transmitter with a different MIMO configuration. For example, the omni-directional preamble-based interference measurement may not be accurate or optimal for a transmitter with 4×4 MIMO configuration or more advanced MIMO technologies.

Figure 5B:
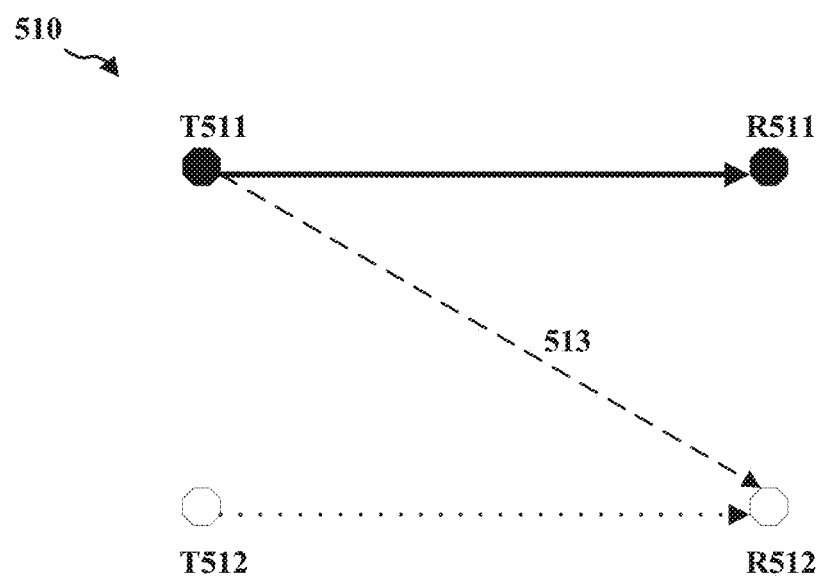
FIG. 5B shows a logical diagram of an LBT mechanism during an LBT session from the perspective of a receiver, according to aspects of the present disclosure.

FIG. 5B shows a logical diagram 510 of an LBT mechanism during an LBT session from the perspective of a receiver or a target network device, according to aspects of the present disclosure. In the logical diagram 510, while the transmitter T511 is transmitting data to the receiver R511, the receiver R512 intends to receive data from the transmitter T512. As part of the LBT protocol, the receiver R512 sends a CTS message to the transmitter T512 in response to a received RTS message from the transmitter T512. In a conventional configuration, before sending the CTS message, the receiver R512 may first check or estimate an omni-directional preamble-based interference 513 from the transmitter T511. The estimated interference level is based on the power detection threshold. The receiver R512 may determine whether the NAV value of the transmitter T511 is reliable according to the omni-directional preamble-based interference measurement. If the estimated interference level is too high, the receiver R512 may decide that the NAV value is not reliable and may not send the CTS message. Thus, this LBT session may fail due to an inaccurate estimate of the interference level.

Accordingly, the interference estimates as described above may directly impact the system performance. More failures of LBT sessions are there due to inaccurate interference estimates, worse is the system performance. Conventionally, the omni-directional preamble-based interference measurement is based on a fixed default power detection threshold that is in turn based on a simple MIMO configuration, such as 2×2 MIMO. Therefore, there is a need for methods and systems to more accurately computing an effective interference to determine an LBT PD threshold and dynamically adjust the PD threshold based on MIMO configuration information when more advanced MIMO technologies are deployed in 5G and beyond.

Figure 6A:
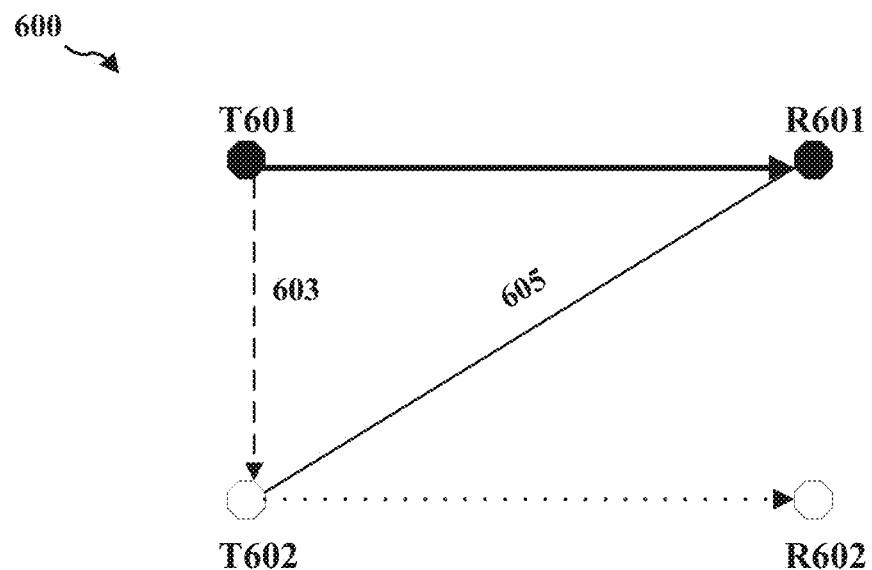
FIG. 6A shows a logical diagram of an LBT mechanism during an LBT session from the perspective of a transmitter, according to aspects of the present disclosure.

FIG. 6A shows a logical diagram 600 of an LBT mechanism during an LBT session from the perspective of a transmitter, according to aspects of the present disclosure. In the logical diagram 600, while the transmitter T601 is transmitting data to receiver R601, the transmitter T602 desires to transmit data to the receiver R602. The transmitter may send an RTS message to the receiver R602 after a CCA or eCCA procedure. Before sending the RTS message, the transmitter T602 may first check or estimate an omni-directional preamble-based interference measurement 603 from the transmitter T601, as in conventional configuration. In addition, an effective interference 605 from T602 to R601 is also estimated. The effective interference is based on the MIMO configuration information of the transmitter T602, as will be explained shortly. The combination of the estimated omni-directional preamble-based interference measurement and the effective interference help the transmitter T602 make a better decision on whether to respect or honor the network allocation vector (NAV) value of the receiver R602. More accurate estimate of the interferences may result in fewer RTS-CTS message exchange failures, and thus a better system performance.

Figure 6B:
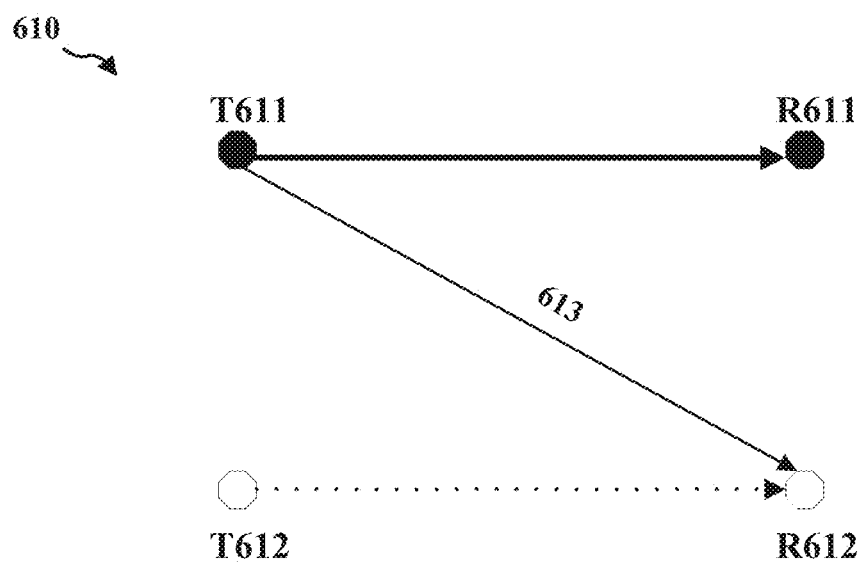
FIG. 6B shows a logical diagram of an LBT mechanism during an LBT session from the perspective of a receiver, according to aspects of the present disclosure.

FIG. 6B shows a logical diagram 610 of an LBT mechanism during an LBT session from the perspective of a receiver or a target network device. In the logical diagram 610, while the transmitter T611 is transmitting data to the receiver R611, the receiver R612 intends to receive data from the transmitter T612. As part of the LBT protocol, the receiver R612 sends a CTS message to the transmitter T612 in response to a received RTS message and after a successful CCA or eCCA procedure. Before sending the CTS message, the receiver R612 may first check or estimate an omni-directional preamble-based interference measurement from the transmitter T611. In addition, the receiver R612 may also estimate an effective interference 613 from the transmitter T611 to the receiver R612. The term effective interference, as used herein, refers to the interference calculated with the MIMO configuration information taken into consideration. The combination of the estimated omni-directional preamble-based interference measurement and the effective interference help the receiver R612 make a better decision on whether to respect or honor the NAV value of the transmitter 612. More accurate estimate of the interferences may result in fewer RTS-CTS message exchange failures, and thus a better system performance.

Therefore, the interference estimate directly impacts the system performance. An effective interference estimate based in part on MIMO configuration information, in combination with the conventional omni-directional preamble-based interference measurement, can result in more accurate interference estimates.

Figure 7:
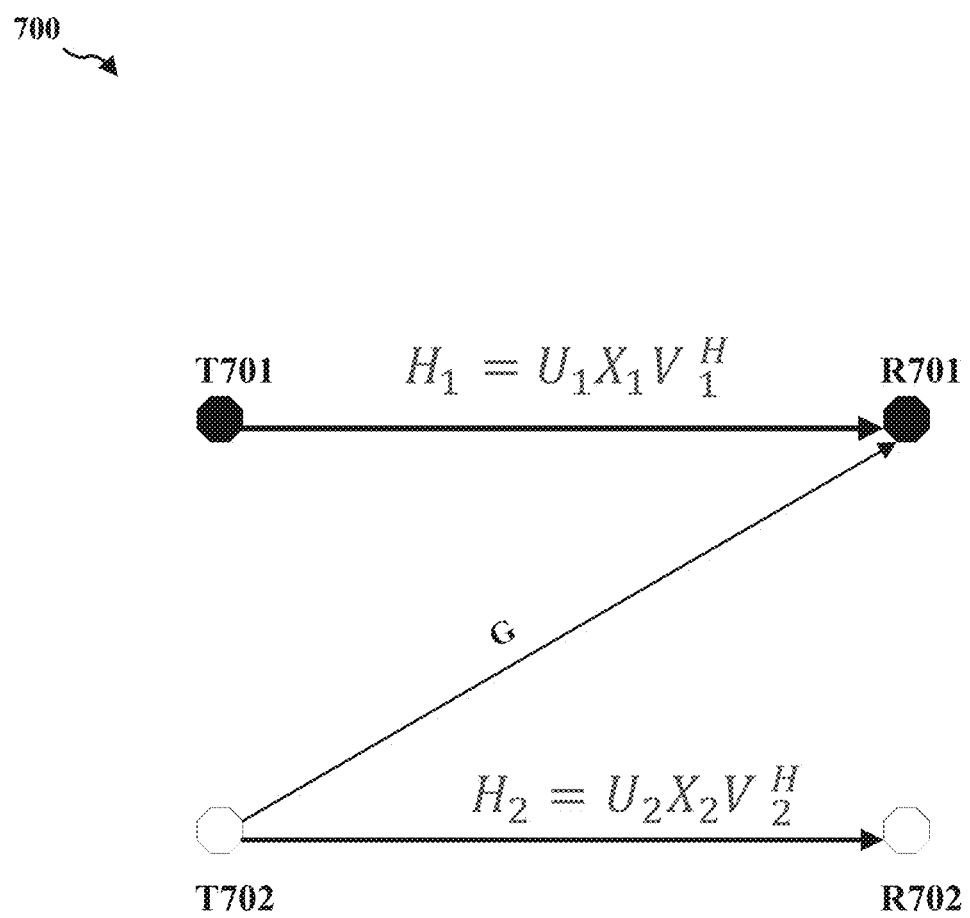
FIG. 7 shows a logical diagram of an LBT mechanism during an LBT session from the aspects of a spatial LBT at a transmitter, according to aspects of the present disclosure.

FIG. 7 shows a logical diagram 700 of an LBT mechanism during an LBT session, according to aspects of the present disclosure. In the logical diagram 700, while the transmitter T701 is transmitting data to receiver R701, the transmitter T702 desires to transmit data to the receiver R702. The transmitter T702 initiates an LBT session by first performing a CCA/eCCA procedure to determine whether the desired wireless channel is available. As part of the CCA/eCCA procedure, the transmitter T702 may first estimate an effective interference from T702 to R701 in addition to an omni-directional preamble-based interference measurement. The transmitter T702 then sends an RTS message to the receiver R702 after ascertaining that the wireless channel is clear to send.

In one example aspect, a singular-value decomposition (SVD) based on TxBF may be used for computing the effective interference. The channel from T701 to R701 is decomposed as $H_1=U_1X_1V_1^H$, where $U_1$ and $V_1^H$ are unitary matrices and $X_1$ represents a diagonal matrix value for $H_1$. Similar, the channel from T702 to R702 can be decomposed as $H_2=U_2X_2V_2^H$, where $U_2$ and $V_2^H$ are unitary matrices and $X_2$ represents a diagonal matrix value for $H_2$. While G represents the channel from T702 to R701, then the effective interference can be computed as $V_1^H G V_2$. The determination of the SVD of the wireless channel based on the unitary matrices and the diagonal matrices of the beamforming matrices are commonly known in the field. In one other example aspects, other methods may be used to compute the effective interferences.

According to some aspects of the present disclosure, when the transmitters T701 and T702 are both using a rank lower than full ranks available, the effective interference may be much smaller than the interference predicted based on an omni-directional preamble-based interference measurement. To accurately estimate the effective interference, the MIMO configuration information such as a rank of the transmitter is taken into account, according to aspects of the present disclosure. This may result in a more accurate estimate of interference, fewer failures in LBT message exchanges, and higher throughput for the wireless communication system.

Figure 8:
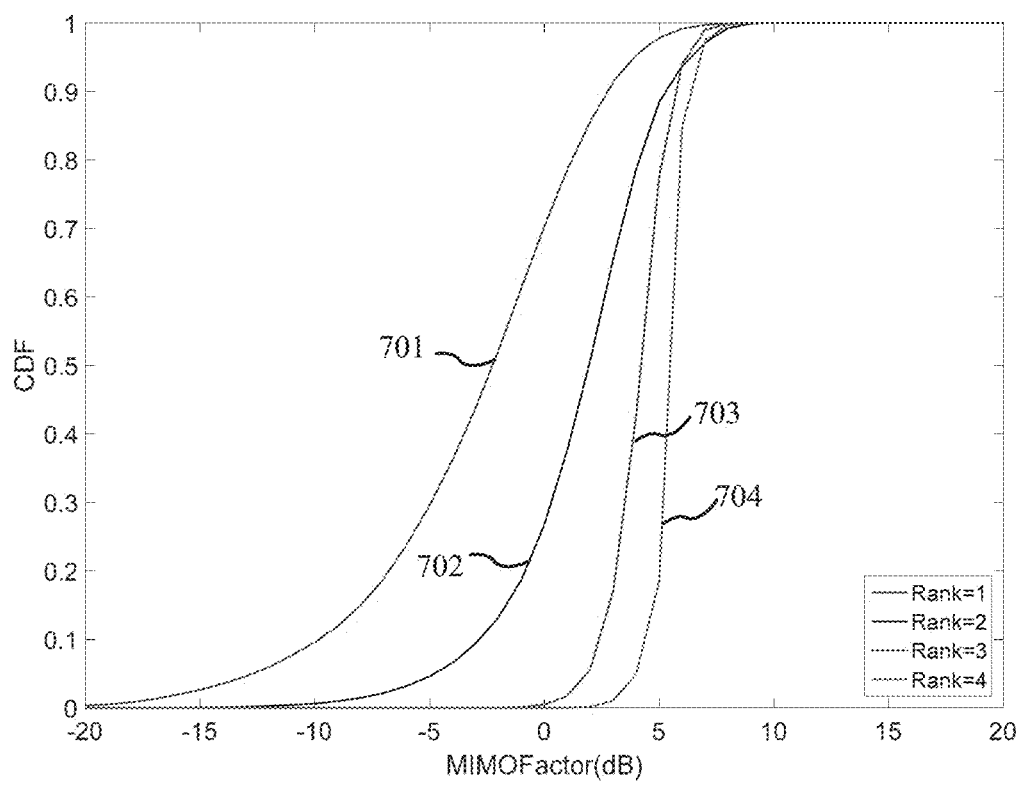
FIG. 8 shows an example simulation illustrating effects of using MIMO configuration information for estimating effective interference.

FIG. 8 shows an example simulation 800 illustrating effects of using MIMO configuration information for estimating effective interference. More specifically, estimated interferences for different MIMO ranks are compared to indicate the impact of MIMO information such as MIMO rank on the estimated interference. A MIMO rank represents the number of parallel data streams used at a MIMO system.

As shown in FIG. 8, on the horizontal axis is an estimated effective interference based on $U_1^H G V_2||/||G||$, where $U_1^H$ and $V_2$ can be viewed as the RxBF and TxBF for spatial white interference to maximize the capacity from a transmitter to a receiver such as from the transmitter T701 to the receiver R702 as shown in FIG. 7 and G is a channel from a transmitter to a receiver such as T702 to R701 of FIG. 7 for estimating an interference when T702 uses $V_2$ as its TxBF and R701 uses $U_1$ as its RxBF. On the vertical axis is a cumulative density function (CDF) indicating a probability distribution of estimated interferences. Accordingly, a higher value on both the horizontal axis and the vertical axis indicates a higher interference level. While the line 701 indicates the combined interference for a transmitter using rank=1, the lines 702, 703, and 704 indicate the interference levels for the transmitter using ranks 2, 3, and 4 respectively.

The example simulation 800 unambiguously shows a difference between effective interference levels when the transmitter uses different MIMO ranks for data transmission. For example, the difference between the interference levels is considerably large for the transmitter using MIMO rank=1 (line 701) versus MIMO rank=4 (line 704). A traditional LBT procedure that does not take into account the MIMO information such as MIMO rank is oblivious to the different interference levels related to different MIMO ranks and accordingly may fail to accurately estimate the interference levels.

Figure 9:
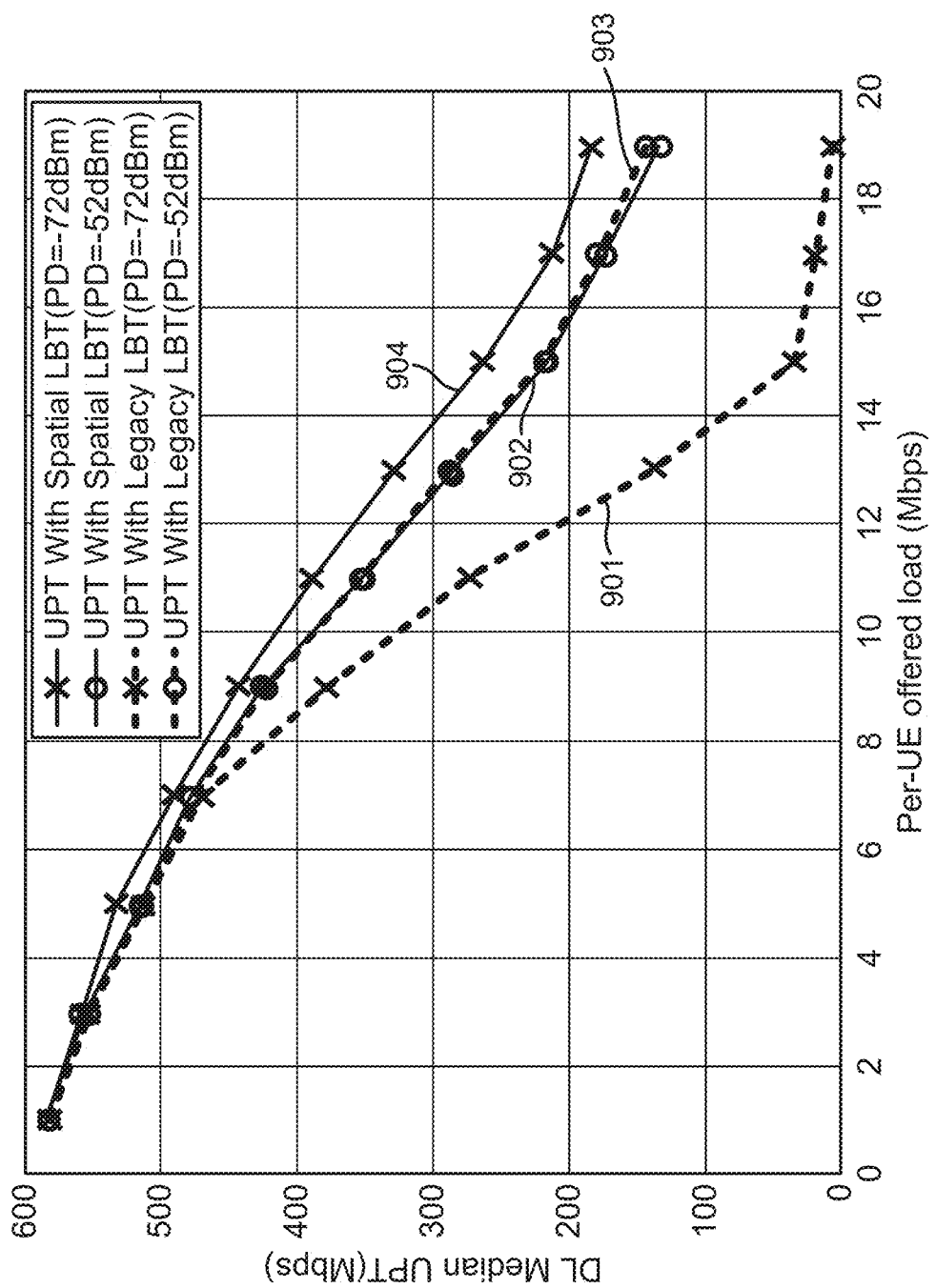
FIG. 9 shows an example simulation of the system performance with adaptively applied LBT thresholds, according aspects of the present disclosure.

FIG. 9 shows one example simulation 900 of the system performance with adaptively applied LBT thresholds, according aspects of the present disclosure. On the horizontal axis is the system throughput in terms of per UE offered load in Mbps. On the vertical axis is downlink median user perceived throughput (UPT) in terms of Mbps. The example simulation 900 shows that the spatial LBT with two different LBT PD thresholds (−72 dBm and −52 dBm respectively) have considerably better performance at 904 and 903 than the counterparts of legacy or omni-direction LBT at lines 901 and 902 respectively. Accordingly, FIG. 9 shows a need for an adaptively applied LBT PD threshold, in place of a fixed, default LBT PD threshold.

Figure 10:
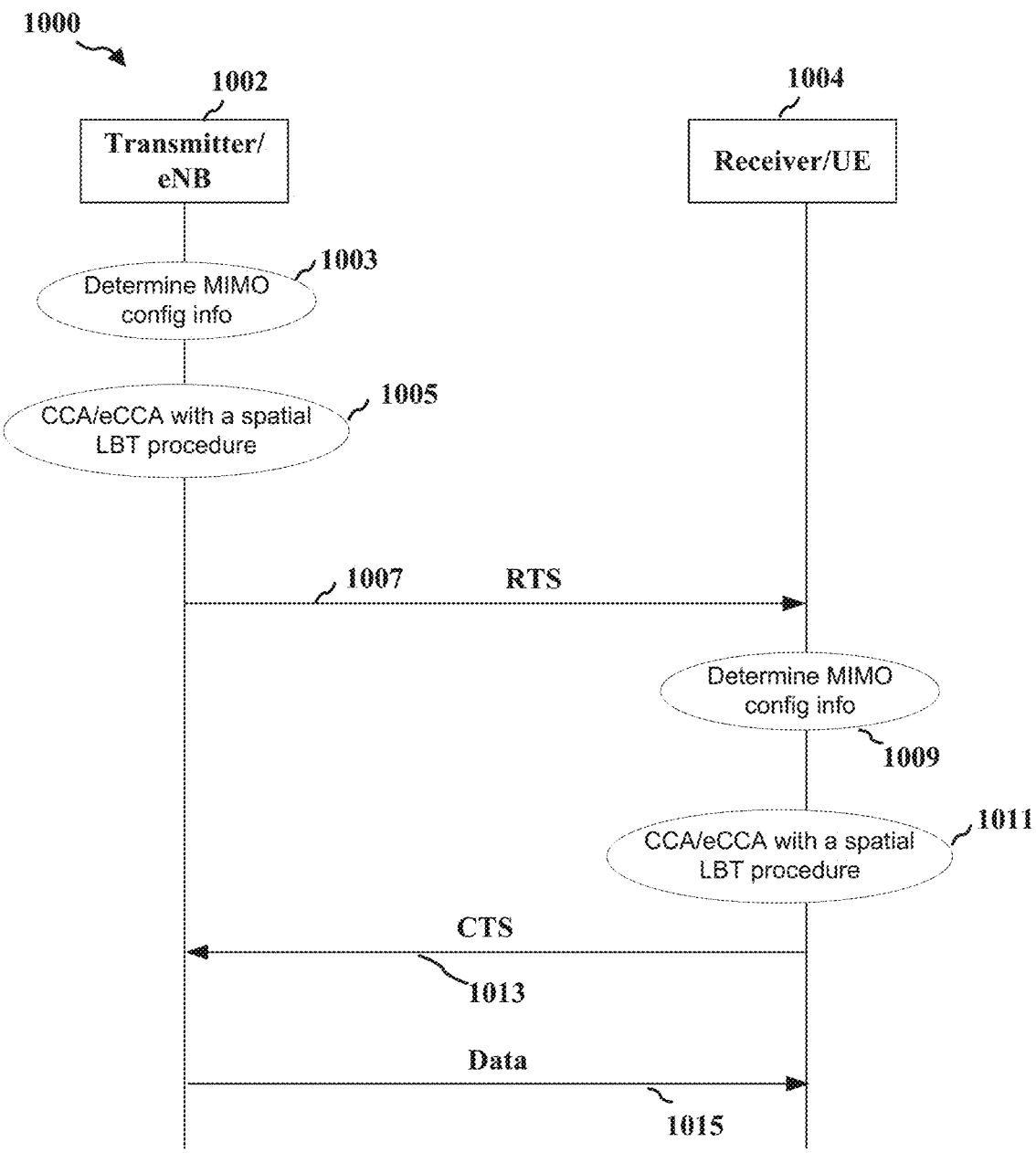
FIG. 10 illustrates an example message flow diagram for an LBT session, according to aspects of the present disclosure.

FIG. 10 illustrates an example message flow diagram 1000 for an LBT session, according to aspects of the present disclosure. In one aspect, the network device 1102 is a transmitter which can be implemented at an eNB. The network device 1004 is a receiver which may be implemented at a UE. However, the transmitter 1002 may also be implemented at a UE and the receiver 1004 implemented at an eNB. A wireless network node such as a relay node may also include the network device 1102 or the network device 1104.

The transmitter 1002 may determine MIMO configuration information of the transmitter at 1003. The MIMO configuration information may include the number of transmit antennas, the number of receive antennas, and an actual MIMO rank in a MIMO system. Again, a MIMO rank, or simply a rank, represents the number of parallel data streams at a transmitter or receiver of a MIMO system. Some of the MIMO configuration information may be obtained from static MIMO configuration of the transmitter and/or receiver, such as the number of transmit antennas and the number of receive antennas. Some other information may not be available from static MIMO configuration. For example, the actual MIMO rank may be affected by a number of factors such as a current battery power level, a resource allocation scheme, among others. The MIMO configuration information may also be stored in a local memory so that the transmitter and/or receiver may have static knowledge of the MIMO configuration.

The transmitter 1002 may carry out at 1105 a clear channel assessment (CCA) procedure or an enhanced CCA (eCCA) including a spatial LBT procedure, based in part on the MIMO configuration information obtained at 1003. The spatial LBT procedure may include computing an effective interference measurement based on a singular value decomposition (SVD) of the wireless transmission channel based at least in part on the TxBF matrix and the RxBF matrix of the MIMO configuration information when the MIMO configuration information is available. The spatial LBT procedure may also include determining an LBT power detection (PD) threshold based at least in part on the computed effective interference measurement and adaptively adjusting the LBT PD threshold, based on the MIMO configuration information. More details on the spatial LBT procedure can be found in FIG. 11 and the corresponding descriptions.

The CCA procedure and eCCA procedure indicate to the transmitting apparatus whether a channel of a wireless transmission medium such as an unlicensed radio frequency spectrum band is available or in use during the gating interval. The MIMO configuration information may allow the transmitter 1002 to better estimate the effective interference level and more accurately determine whether the channel of the transmission medium is clear for data transmission.

After determining the MIMO configuration information and ascertaining through the above CCA or eCCA procedure that the channel is clear to send and, the transmitter 1102 may reserve a channel through a hand-shake procedure via an RTS-CTS message exchange. The transmitter 1002 at 1007 may transmit an RTS message to the receiver 1004 to indicate its desire to reserve an indicated channel for data transmission. The transmitter 1002 may include in the RTS message the obtained MIMO configuration information.

The receiver 1004 at 1009 may determine the MIMO configuration information from the received RTS message. This may include extracting and verifying the MIMO configuration information from the received RTS message.

The transmitter 1002 may carry out at 11011 a clear channel assessment (CCA) procedure or an enhanced CCA (eCCA) including a spatial LBT procedure, based in part on the MIMO configuration information obtained at 1009. The spatial LBT procedure may include computing an effective interference measurement based on a singular value decomposition (SVD) of the wireless transmission channel based at least in part on the TxBF matrix and the RxBF matrix of the MIMO configuration information when the MIMO configuration information is available. The spatial LBT procedure may also include determining an LBT power detection (PD) threshold based at least in part on the computed effective interference measurement and adaptively adjusting the LBT PD threshold, based on the MIMO configuration information. More details on the spatial LBT procedure for the target network can be found in FIG. 14 and the corresponding descriptions.

The CCA procedure and eCCA procedure indicate to the receiver 1004 whether a channel of a wireless transmission channel such as an unlicensed radio frequency spectrum channel is available or in use during the gating interval (also referred to as an LBT radio frame or a CCA radio frame). The MIMO configuration information may allow the receiver 1004 to better estimate the effective interference level and more accurately determine whether the channel of the transmission medium is clear for data transmission.

In response to the received RTS message, the receiver 1004 may check its resource and other conditions for receiving data. Based at least in part on the MIMO configuration information, the receiver 1004 ascertains the requested channel is clear to receive data from the transmitter 1002, the receiver 1004 sends at 1013 a CTS message to the transmitter 1002 to allow the data transmission to proceed.

The receiver 1004 may include at least part of the MIMO information in the CTS message. In some aspects of the present disclosure, the CTS message includes at least some MIMO configuration information from the RTS message, because some other nodes may receive the CTS message but failed to receive the RTS message. The MIMO information included in the CTS message may be same as or different from the MIMO information included in the received RTS message. More details on the MIMO information included in the CTS message can be found in FIG. 14 and the corresponding descriptions. Once the CTS message is received, the transmitter 1002 at 1015 may start data transmission, based in part on the MIMO configuration information.

In case that the channel reservation fails for any reasons, the transmitter 1002 may start the entire process again at 1003. The reasons that the channel reservation failure may include that the RTS or CTS message is lost, the receiver does not have sufficient resources, etc. With the MIMO configuration information available, both the transmitter 1002 and receiver 1004 may make more accurate measurements of the effective interferences and may reduce the chance for a failure of the RTS-CTS message exchange.

Figure 11:
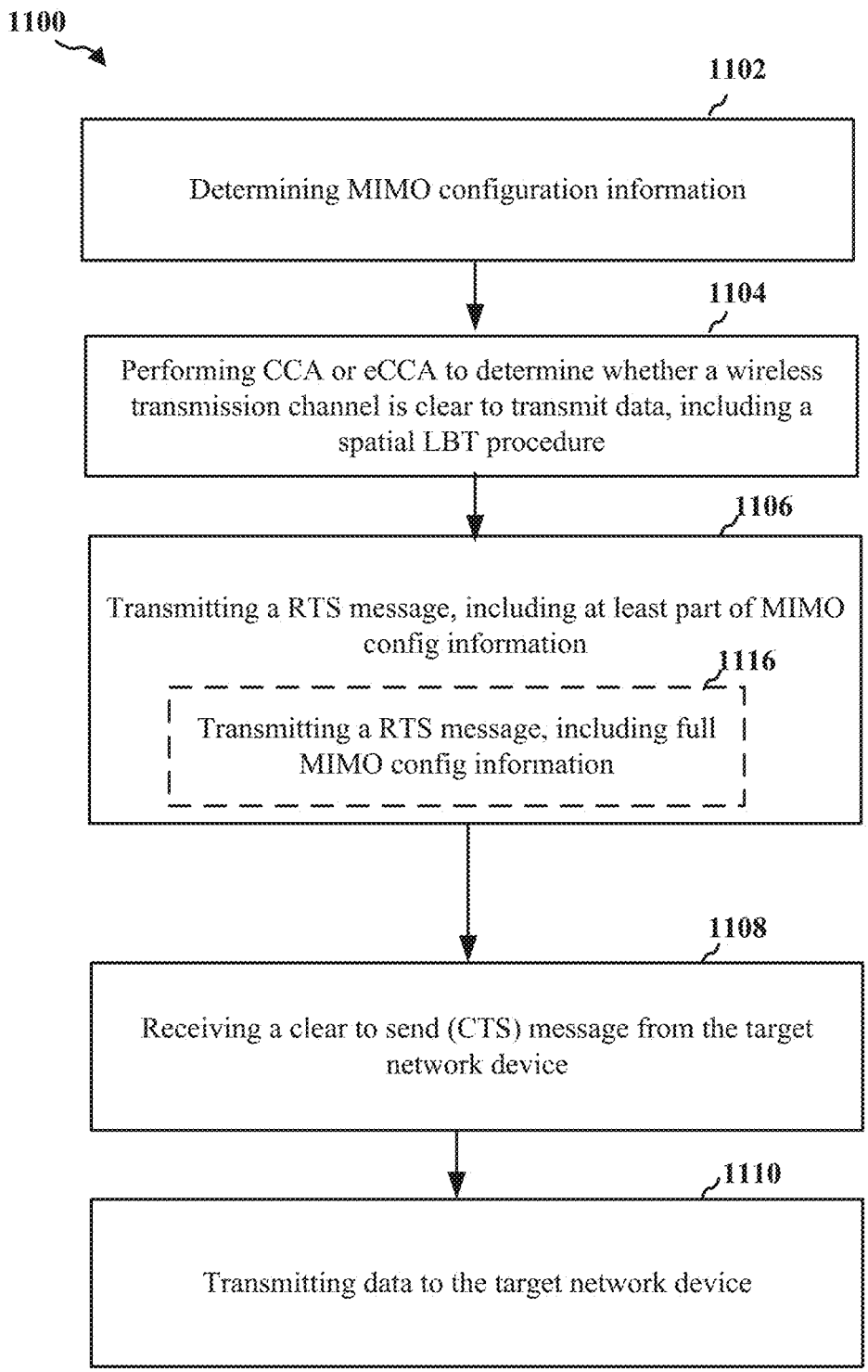
FIG. 11 is a flowchart of a method of wireless communication, according to aspects of the present disclosure.

FIG. 11 is a flowchart 1100 of a method of wireless communication, according to aspects of the present disclosure. The method may be performed by transmitter such as a base station (e.g., 102, 180, and 310), a UE (e.g., the UE 104/350, 1250) or any other node with a transmitter. At 1102, in one example aspect, the transmitter determines MIMO configuration information. As described above, determining the MIMO configuration information may include determining for the LBT session whether the MIMO configuration information is available. In one example aspect, determining whether the MIMO configuration information is available is based on the local stored MIMO configuration. In some example aspect, the MIMO information may not be available. For example, a receiving network device may not be in a receiving mode when a broadcast message such as an RTS or CTS message was sent over the air. Or the broadcast message may be lost due to unexpected interferences. In some example aspect, the MIMO configuration information may be partially available. For example, the TxBF and RxBF in the MIMO configuration information may not be transmitted simultaneously by the transmitter.

Once the transmitter determines that the MIMO configuration information is available, the transmitter may further determine at least one or more of the following: the number of transmit antennas, the number of receive antennas, a transmit beamforming (TxBF) matrix, a receive beamforming (RxBF) matrix, and a MIMO rank. The TxBF matrix, also referred to as a spatial mapping matrix, describes the mapping of each subcarrier for each space-time stream to all transmit antennas. Similarly, the RxBF matrix describes the mapping of each subcarrier for each space-time stream to all receive antennas. As indicated above, the MIMO rank indicates the number of parallel data streams that can be carried out at a transmitter or a receiver.

At 1104, the method 1100 includes performing a CCA or eCCA procedure to determine whether a wireless transmission medium is clear to transmit data or a message to a target network device, including a spatial LBT procedure. The CCA procedure and eCCA procedure may include listening to the transmission medium to determine whether there is another network device transmitting at the moment. The "listening" is also referred to as sensing of the transmission medium. The CCA procedure or the eCCA procedure in the end indicates to the transmitting apparatus whether a channel of a wireless transmission medium such as an unlicensed radio frequency spectrum band is available or in use during the gating interval. In some aspects of the present disclosure, performing a CCA or eCCA procedure includes adaptively performing the spatial LBT procedure.

The spatial LBT procedure based on the MIMO configuration information may allow the transmitter 1002 to better estimate the effective interference level and more accurately determine whether the channel of the transmission medium is clear for data transmission during the CCA or eCCA procedure. The spatial LBT procedure may include computing an effective interference measurement. In one example aspect, the effective interference measurement is based on a singular value decomposition (SVD) of the wireless transmission channel based at least in part on the TxBF matrix and the RxBF matrix of the MIMO configuration information. The determination of the SVD of the wireless channel based on the unitary matrices and the diagonal matrices of the beamforming matrices are commonly known in the field. The spatial LBT procedure may include comparing the effective interference measurement with a default LBT power detection (PD) threshold and determine if the wireless transmission channel is clear. For example, if the effective interference measurement is below the default LBT PD threshold, the wireless transmission channel is deemed clear.

As shown in FIG. 9 and described therein, the LBT PD threshold may be closely related to whether a network device can detect a data packet on a wireless transmission channel. An accurate LBT PD threshold may help improve the data transmission efficiency, thus the system performance, by reducing the chance of missing a data packet or mistaking noise as a data packet on the wireless channel. According to aspects of the present disclosure, an adaptively adjustable LBT PD threshold may improve the efficiency of data transmission during the spatial LBT procedure.

According to some aspect of the present disclosure, adaptive performing of the spatial LBT procedure may include using an LBT PD threshold larger than the default LBT PD threshold for the transmitting network device to transmit data when only a part of the MIMO configuration information is available. The partial MIMO information may not be sufficient to estimate an effective interference level but may be sufficient to determine that an ongoing or incoming data transmission is of a rank lower than a full rank of the transmitting network device. When a MIMO rank lower than the full MIMO rank is used for transmission, the default LBT PD threshold which is based on the assumption of the full MIMO rank, may result in an overestimated interference. Accordingly, relaxing or using a larger LBT PD threshold may compensate for the overestimated interference and thus may result in a better system performance.

According to some aspect of the present disclosure, adaptive performing of the spatial LBT procedure may also include using a larger LBT PD threshold when a transmit power for the full rank of the transmitting network device is inadequate for an ongoing or an incoming data transmission. In other words, the transmit power is lower than needed for the full rank of the transmitting network device for an ongoing or incoming data transmission. When the transmit power for the full MIMO rank is inadequate, the effect may be similar to that of using a lower MIMO rank than the full MIMO rank. As described above, the larger LBT PD threshold may result in a better system performance.

According to some aspect of the present disclosure, adaptive performing of the spatial LBT procedure may include using a larger LBT PD threshold when a lower transmission rank is determined from a blind signal processing on an ongoing or incoming data transmission while rank information is not present in the MIMO configuration information or the MIMO configuration information is not available. The blind signal processing may refer to processing of other signaling messages that may include or imply some MIMO rank related information.

According to some aspect of the present disclosure, adaptive performing of the spatial LBT procedure may include using a larger LBT PD threshold when a low MIMO rank is determined from a static MIMO configuration indicated in the MIMO configuration information without listening to the wireless transmission medium. A MIMO rank information may be derived from the static MIMO configuration such as a number of active transmit antenna ports or receive antenna ports.

According to some aspect of the present disclosure, adaptive performing of the spatial LBT procedure may include using a larger LBT PD threshold when a MIMO configuration of the transmitting network device is asymmetric. For example, one example asymmetric MIMO configuration may include an eNB with 8 antennas and a UE with 2 antennas.

According to some aspect of the present disclosure, adaptive performing of the spatial LBT procedure may also include computing an omni-directional preamble-based interference measurement for LBT PD threshold when the MIMO configuration information is not available. When the MIMO configuration information is not available, the transmitter may revert to using default omni-directional preamble-based interference measurement.

According to some aspect of the present disclosure, adaptive performing of the spatial LBT procedure may include prior to transmitting the broadcast message such as an RTS message, estimating an omni-directional preamble-based interference measurement from another transmitting network device to the transmitting network device and an effective interference from the transmitting network device to a victim network device when the MIMO configuration information is available. When the MIMO configuration information is available, the transmitter may estimate an effective interference in addition to the conventional omni-directional preamble-based interference measurement to have an overall more accurate interference estimate.

At 1106, the method 1100 includes transmitting a broadcast message, prior to transmitting data to the target network device, the broadcast message including at least part of the MIMO configuration information. In one example aspect, the broadcast message is a request to send (RTS) message for the LBT session. An eNB may broadcast an RTS message, with an intended target network device ID embedded in the header of the broadcast message. This allows the target network device to determine that the RTS message is intended for this target network device and every other device to know that the transmitting network device intends to transmit.

In some case, the RTS message does not include any MIMO configuration information if the MIMO configuration information is not available. In some other case, the RTS message may include only partial MIMO configuration information if only the partial information is available, or the transmitter chooses to send partial MIMO configuration information to the target network device.

The existing RTS message format may not have a designated field to accommodate the MIMO configuration information. In one aspect of the present disclosure, a new information element (IE) is created for the RTS message format for the MIMO configuration information. The new IE may have a flexible length to accommodate a variety of the MIMO configuration information. In another aspect of the present disclosure, the transmitting device may use a header of an existing broadcast message to send the MIMO configuration information.

At 1116, the method 1100 may optionally include transmitting the RTS message, including the full MIMO configuration information in the RTS message if the transmission data is of a high priority. In one example aspect, when transmitting high-priority data such as voice data or data of a premium service, the transmitting network device will try to obtain and include full MIMO configuration information in the RTS message. One effect of including the full MIMO configuration information in the RTS message is to allow the target network device to better estimate an effective interference and reduce the chance of a CCA or eCCA procedure failure due to inaccurate measurements of interferences. Another potential effect of including the full MIMO configuration information in the RTS message is to reduce the chance of dropping the packets of high-priority data or the RTS message itself.

At 1108, the method 1100 includes receiving a CTS message from the target network device. The transmitting network device may receive the CTS message that is sent by the target network device in response to the RTS message. The CTS may include either all or part of the MIMO configuration information that the transmitting network device sent in the RTS message. According to one aspect of the present disclosure, the CTS message may include part of the MIMO configuration information to inform the transmitting network device of the MIMO configuration at the target network device.

According to some aspect of the present disclosure, the CTS message includes at least some information already in the RTS at least in part because some other nodes nearby may have received only the CTS message but not the corresponding RTS message. For example, a node that is close to the receiver but far away from the transmitter, may receive the CTS message from the nearby receiver, but not the RTS message from the far-away transmitter. The MIMO configuration information included in the CTS message may be same as or different from the MIMO configuration information included in the RTS message sent to the target network device, as will be discussed later.

At 1110, the method 1100 includes transmitting data to the target network device after the receiving the CTS message from the target network device. The CTS message confirm the network resource reservation that is requested in the RTS message sent by the transmitting network device. Once the network resource reservation is confirmed, the data transmission from the transmitting network device may commence. The transmitting network device may use the MIMO configuration information and the adjusted LBT PD threshold to better estimate interference.

In one aspect of the present disclosure, the transmitting network device may apply the spatial LBT procedure to better estimate interference and the adjusted LBT PD threshold for more efficient data transmission, in addition to applying the spatial LBT procedure in the CCA or eCCA procedure for sending the RTS message.

The flowchart 1100 is for illustration purpose and shows one possible process for adaptively performing the spatial LBT procedure based on MIMO configuration information and LBT PD threshold. In practice, one or more steps shown in illustrative flowchart 1100 may be combined with other steps, performed in any suitable order, performed in parallel (e.g., simultaneously or substantially simultaneously), or removed.

Figure 12:
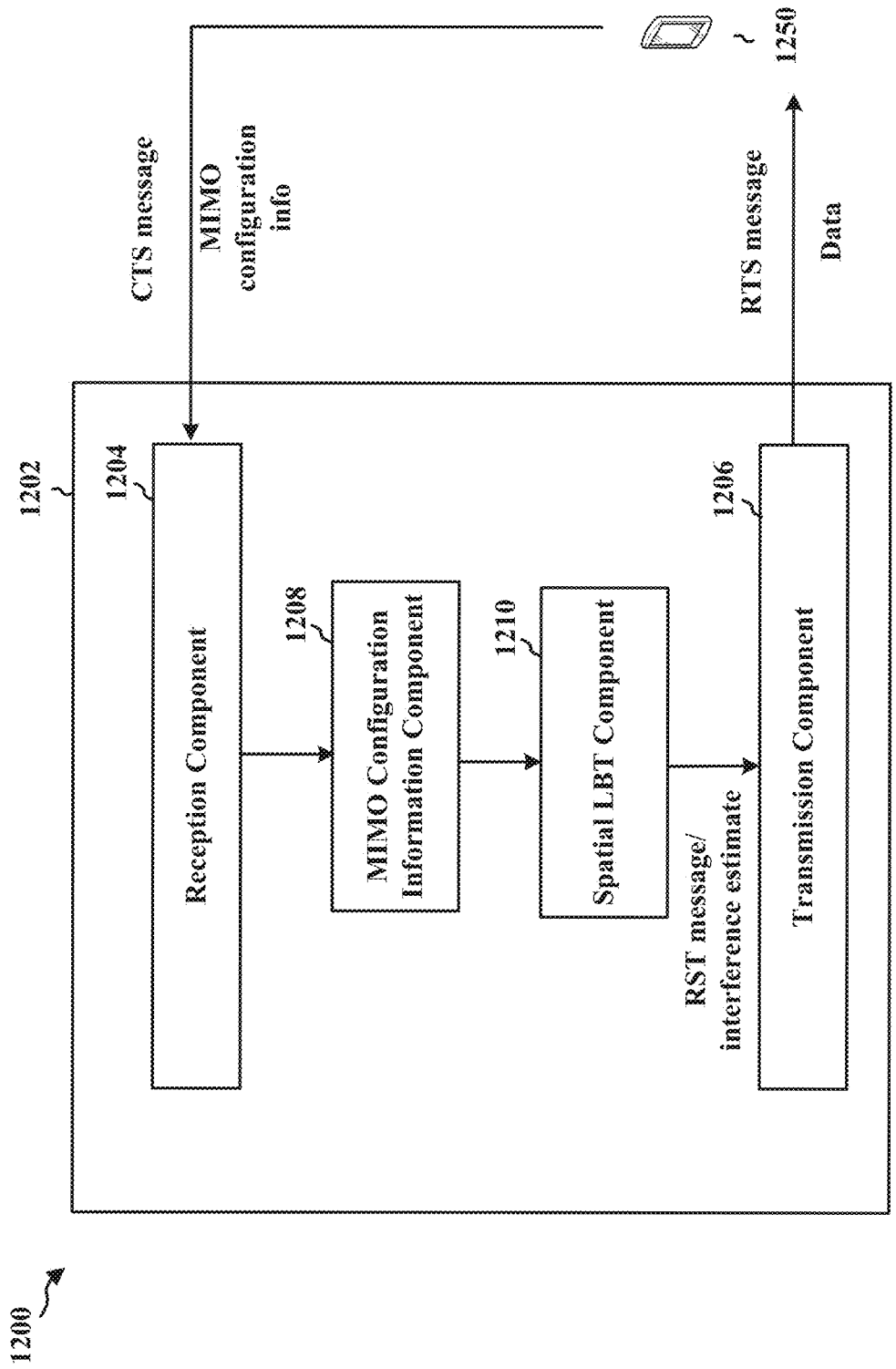
FIG. 12 is a conceptual data flow diagram illustrating the data flow between different means/components in an exemplary apparatus, according to aspects of the present disclosure.

FIG. 12 is a conceptual data flow diagram 1200 illustrating the data flow between different means/components in an exemplary apparatus 1202. The apparatus may be a base station (e.g., eNB 102, 180, 310, 1550). The apparatus includes a reception component 1204 that receives UL communication from a target network device such as a UE (e.g., the UE 104/350, 1250,) and a transmission component 1206 that transmits downlink communication to UE 1250. The apparatus includes a MIMO configuration information component that determines MIMO configuration information of the transmitting network device for an LBT session. The reception component 1204 may receive an internal message from an internal CCA or eCCA procedure to indicate whether the wireless transmission medium is clear to transmit. The reception component 1204 may also receive a CTS message from a target network device such as the UE 1250 to confirm a network resource reservation. The apparatus may also include a spatial LBT component 1210 that may adaptively adjust the LBT PD thresholds and efficiently estimate an effective interference based on the MIMO configuration information. The spatial LBT component may provide an RTS message or transmission data to the transmission component for transmission to the UE 1250. The RTS message may include the MIMO configuration determined at the MIMO configuration information component 1208. The UE 2150 may respond to the apparatus 1202 with a CTS message, which may include the MIMO configuration information.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. Although unlicensed frequency bands are described as an example for implementation of the spatial LBT procedure, the method described herein is applicable to licensed frequency band as well.

Figure 13:
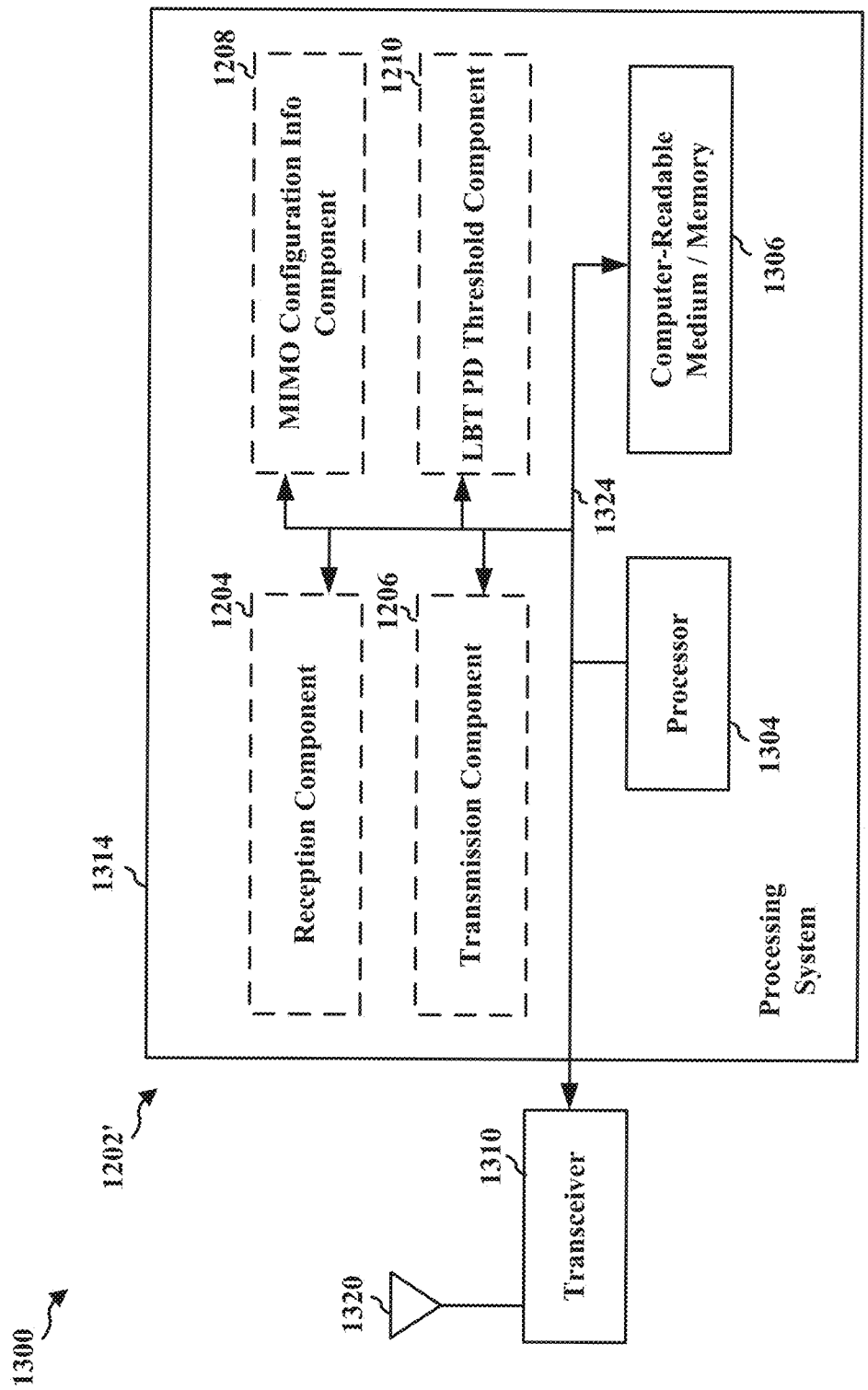
FIG. 13 is a diagram illustrating an example of a hardware implementation for an apparatus, according to aspects of the present disclosure.

FIG. 13 is a diagram 1300 illustrating an example of a hardware implementation for an apparatus 1202 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for performing a clear channel assessment (CCA) or an enhanced CCA (eCCA) to determine whether a wireless transmission medium is clear to transmit data to a target network device, means for determining multiple input multiple output (MIMO) configuration information, when the wireless transmission medium is clear to transmit, and means for transmitting a broadcast message, prior to transmitting data to the target network device, the broadcast message including at least part of the MIMO configuration information. The apparatus 1202/1202' for wireless communication also includes means for transmitting the broadcast message, including full MIMO configuration information in the broadcast message, when transmission data for the target network device at the transmitting network device is of a high priority, means for receiving a clear to send (CTS) message from the target network device, and means for transmitting data to the target network device. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
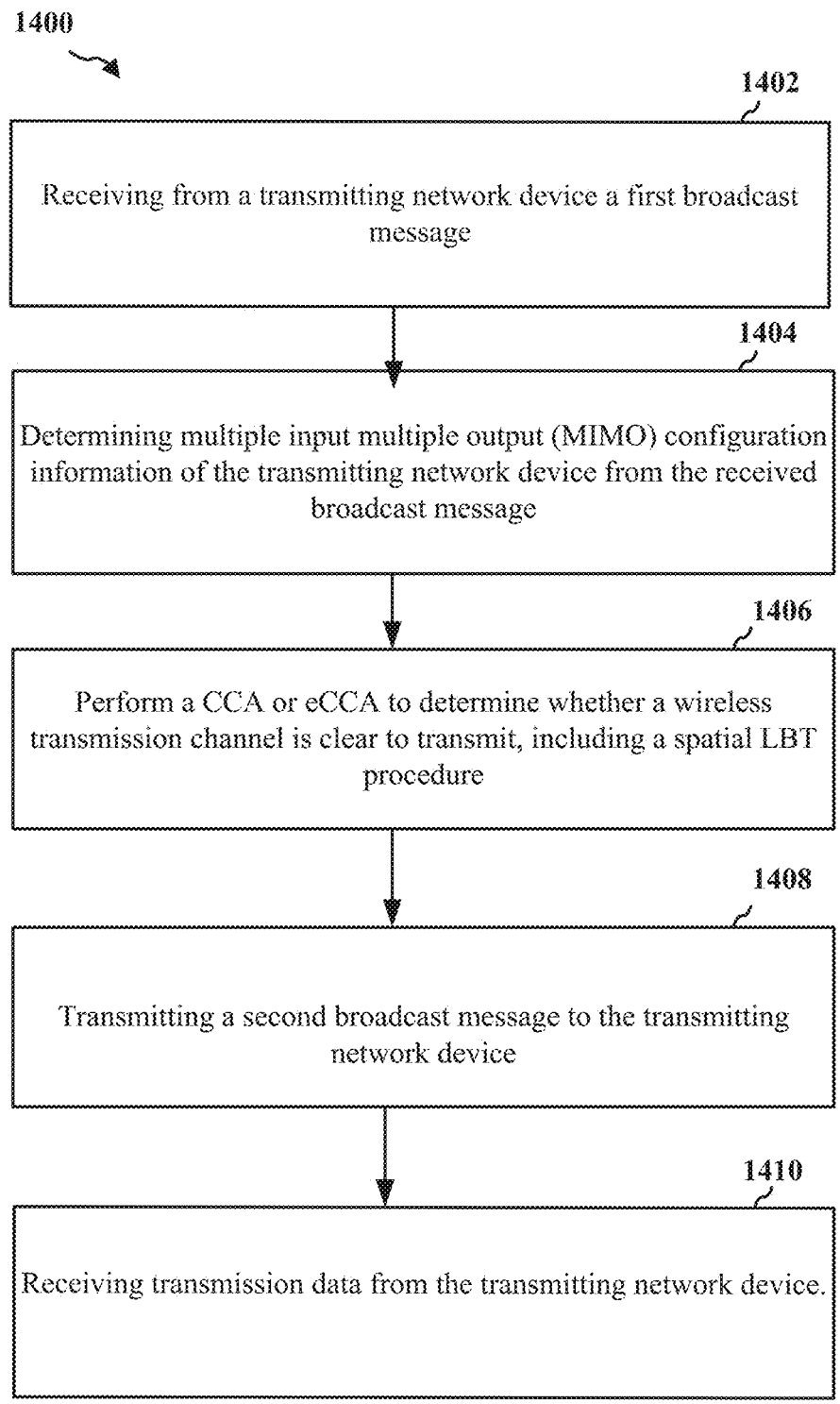
FIG. 14 is a flowchart of a method of wireless communication, according to aspects of the present disclosure.

FIG. 14 is a flowchart 1400 of a method of wireless communication. The method may be performed by a target network device or a receiver such as a UE (e.g., the UE 104/350, 1250) or any other node with a receiver or a transceiver. At 1402, in one example aspect, the target network device receives a first broadcast message from a transmitting network device. In one aspect of the present disclosure, the first broadcast message is an RTS message sent from the transmitting network device to reserve the network resource at the target network device for a subsequent data transmission. The RTS message may include MIMO configuration information of the transmitting network device.

The method 1400 includes at 1404 determines MIMO configuration information from the received first broadcast message. Determining the MIMO configuration information may include decoding and extracting from the received first broadcast message information on whether the MIMO configuration information is available. As described above, in some example aspect, the MIMO information may not be available. In some example aspect, the MIMO configuration information may be partially available.

Once the target network device determines that the MIMO configuration information is available, the transmitter may further determine at least one or more of the following: the number of transmit antennas, the number of receive antennas, a transmit beamforming (TxBF) matrix, a receive beamforming (RxBF) matrix, and a MIMO rank. As indicated above, the MIMO rank indicates the number of parallel data streams that can be carried out at a transmitter or a receiver.

At 1406, the method 1400 includes performing a CCA or eCCA procedure to determine whether a wireless transmission medium is clear to transmit data or a message to a target network device, including a spatial LBT procedure. The CCA procedure and eCCA procedure, as described here, mirrors that of FIG. 11 and the corresponding description. The CCA procedure and eCCA procedure may include listening to the transmission medium to determine whether there is another network device transmitting at the moment. The "listening" is also referred to as sensing of the transmission medium. The CCA procedure and eCCA procedure in the end indicate to the transmitting apparatus whether a channel of a wireless transmission medium such as an unlicensed radio frequency spectrum band is available or in use during the gating interval. In some aspects of the present disclosure, performing a CCA or eCCA procedure also includes adaptive performing of the spatial LBT procedure.

The spatial LBT procedure based on the MIMO configuration information may allow the target network device or receiver to better estimate an effective interference level and more accurately determine whether the channel of the transmission medium is clear for data transmission during the CCA or eCCA procedure. The spatial LBT procedure may include computing an effective interference measurement based on a singular value decomposition (SVD) of the wireless transmission channel based at least in part on the TxBF matrix and the RxBF matrix of the MIMO configuration information when the MIMO configuration information is available. The spatial LBT procedure may include comparing the effective interference measurement with a default LBT power detection (PD) threshold and determine if the wireless transmission channel is clear. For example, if the effective interference measurement is below the default LBT PD threshold, the wireless transmission channel is deemed clear.

As shown in FIG. 9 and described therein, the LBT PD threshold may be closely related to whether a network device can detect a data packet on a wireless transmission channel. An accurate LBT PD threshold may help improve the data transmission efficiency, thus the system performance, by reducing the chance of missing a data packet or mistaking noise as a data packet on the wireless channel. According to aspects of the present disclosure, an adaptively applying LBT PD threshold may improve the efficiency of data transmission during the spatial LBT procedure.

According to some aspect of the present disclosure, adaptive performing of the spatial LBT procedure may include using an LBT PD threshold larger than the default LBT PD threshold for the target network device to receive data when only a part of the MIMO configuration information is available. The partial MIMO information is not sufficient or does not allow the network device to estimate an effective interference level but sufficient to determine that an ongoing or incoming data transmission is of a rank lower than a full rank of the transmitting network device. When a MIMO rank lower than the full MIMO rank is used for transmission, the default LBT PD threshold which is based on the assumption of the full MIMO rank, may result in an overestimated interference. Accordingly, relaxing or using a larger LBT PD threshold may compensate for the overestimated interference and thus result in a better performance.

According to some aspect of the present disclosure, adaptive performing of the spatial LBT procedure may include using a larger LBT PD threshold when a transmit power for the full rank of the transmitting network device is inadequate for an ongoing or an incoming data transmission. In other words, the receive power is lower than needed for the full rank of the target network device for an ongoing or incoming data transmission. When the receive power for the full MIMO rank is inadequate, the effect may be similar to that of using a lower MIMO rank than the full MIMO rank. As described above, the larger LBT PD threshold may result in a better performance.

According to some aspect of the present disclosure, adaptive performing of the spatial LBT procedure may include using a larger LBT PD threshold when a lower transmission rank is determined from a blind signal processing on an ongoing or incoming data transmission while rank information is not present in the MIMO configuration information. The blind signal processing may refer to processing of other signaling messages that may include or imply some MIMO rank related information.

According to some aspect of the present disclosure, adaptive performing of the spatial LBT procedure may include using a larger LBT PD threshold when a low MIMO rank is determined from a static MIMO configuration indicated in the MIMO configuration information without listening to the wireless transmission medium. A MIMO rank information may be derived from the static MIMO configuration such as a number of active transmit antenna ports or receive antenna ports.

According to some aspect of the present disclosure, adaptive performing of the spatial LBT procedure may include using a larger LBT PD threshold when a MIMO configuration of the target network device is asymmetric. For example, one example asymmetric MIMO configuration may have an eNB with 8 antennas and a UE with 2 antennas.

According to some aspect of the present disclosure, adaptive performing of the spatial LBT procedure may include using an omni-directional preamble-based interference measurement for LBT PD threshold when the MIMO configuration information is not available. When the MIMO configuration is not available, the transmitter may revert to using the default omni-directional preamble-based interference measurement.

According to some aspect of the present disclosure, adaptive performing of the spatial LBT procedure may include prior to transmitting the broadcast message, estimating a conventional omni-directional preamble-based interference level from another transmitting network device to the transmitting network device and an effective interference from the transmitting network device to a victim network device when the MIMO configuration information is available. When the MIMO configuration information is available, the target network device may estimate an effective interference in addition to the conventional omni-directional preamble-based interference measurement to have an overall more accurate interference estimate.

At 1408, the method 1400 includes transmitting a second broadcast message to the transmitting network device, prior to receiving data from the target network device, the broadcast message including at least part of the MIMO configuration information. In one example aspect, the broadcast message is a clear to send (CTS) message for an LBT session and the CTS message may include the MIMO configuration information determined at 1404.

The CTS may include either all or part of the MIMO configuration information that the transmitting network device sent in the RTS message. According to one aspect of the present disclosure, the CTS message may include part of the MIMO configuration information to inform the transmitting network device of the MIMO configuration at the target network device. In some case, the CTS message does not include any MIMO configuration information if the MIMO configuration information is not available.

In some aspects of the present disclosure, the CTS message includes at least some MIMO configuration information from the RTS message, because some other nodes may receive the CTS message but failed to receive the RTS message. The MIMO information included in the CTS message may be same as or different from the MIMO information included in the received RTS message. Although the transmitting network device can fix the TxBF based on the SVD of the wireless channel, the RxBF so determined at the transmitting network device may not be optimal in the presence of interferences. Thus, the target network device or the receiver may need to compute a better RxBF and send the newly computed RxBF in the CTS message to override the preliminary one included in the RTS message.

The existing CTS message format may not have a designated field to accommodate the MIMO configuration information. In one aspect of the present disclosure, a new information element (IE) is created in the CTS message format for the MIMO configuration information. The new IE may have a flexible length to accommodate a variety of the MIMO configuration information.

At 1410, the method 1400 includes receiving data from the transmitting network device after sending the CTS message. The CTS message confirm the network resource reservation that is requested in the RTS message sent by the transmitting network device. Once the network resource reservation is confirmed, the data transmission from the transmitting network device may commence.

In one aspect of the present disclosure, the target network device may apply the spatial LBT procedure to better estimate interference and the adjusted LBT PD threshold for more efficient data receptions, in addition to applying the spatial LBT procedure in the CCA or eCCA procedure for sending the CTS message.

The flowchart 1400 is for illustration purpose and shows one possible method for adaptively performing the spatial LBT procedure based on MIMO configuration information and LBT PD threshold. In practice, one or more steps shown in illustrative flowchart 1100 may be combined with other steps, performed in any suitable order, performed in parallel (e.g., simultaneously or substantially simultaneously), or removed.

Figure 15:
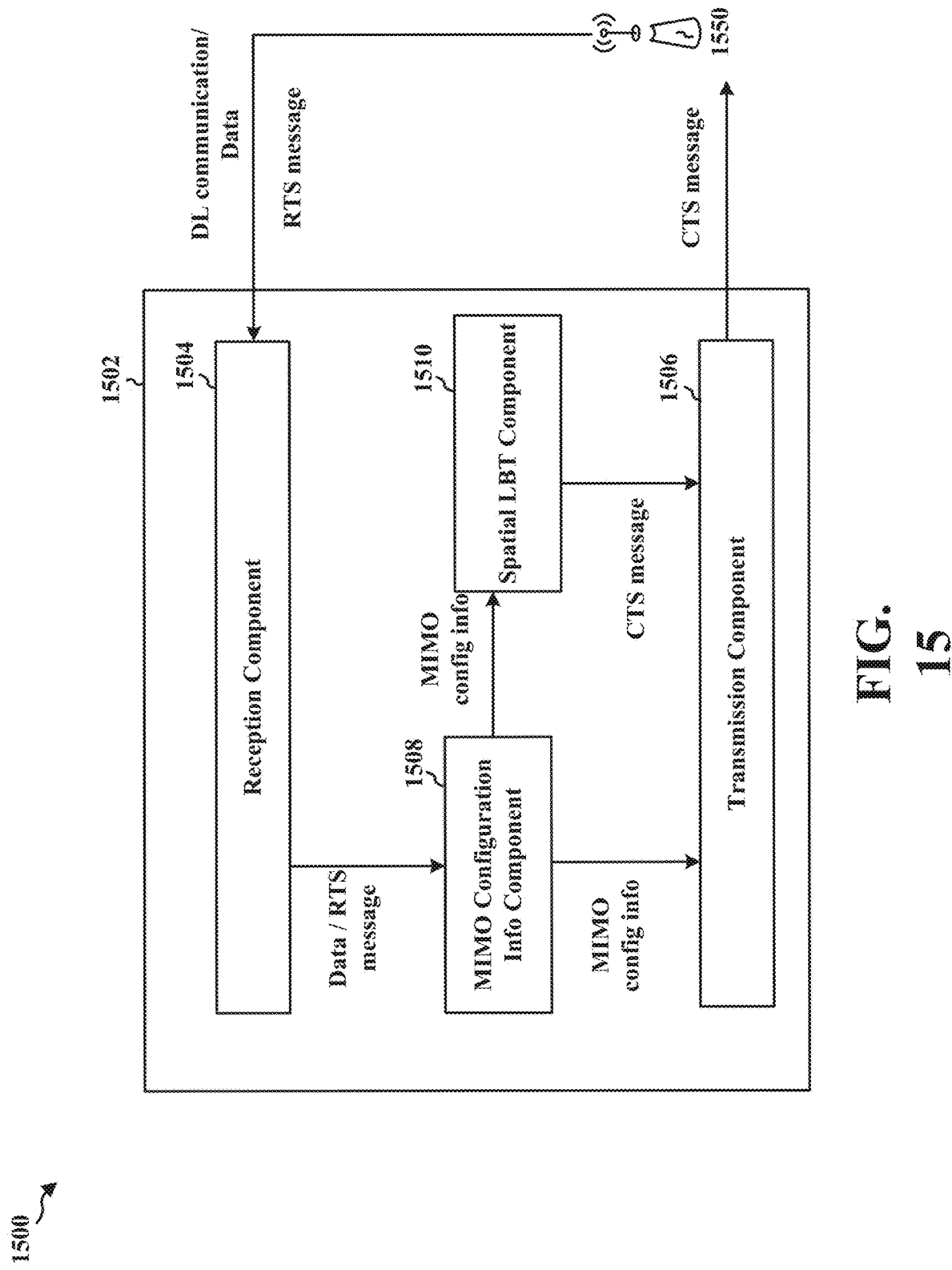
FIG. 15 is a conceptual data flow diagram illustrating the data flow between different means/components in an exemplary apparatus, according to aspects of the present disclosure.

FIG. 15 is a conceptual data flow diagram 1500 illustrating the data flow between different means/components in an exemplary apparatus 1502. The apparatus may be a UE (e.g., the UE 104/350, 1250, the apparatus 1502/1502'). The apparatus includes a reception component 1504 that receives DL communication from a transmitting network device such as an eNB and a transmission component 1506 that transmits UL communication to eNB 1550. The apparatus includes a MIMO configuration information component 1508 that determines MIMO configuration information for an LBT session. The reception component 1504 may receive an RTS message from a transmitting network device such as the eNB 1550 to reserve a network resource. The apparatus may also include a spatial LBT component 1510 that may adaptively adjust the LBT PD thresholds and efficiently estimate an effective interference. The spatial LBT component 1510 in collaboration with MIMO configuration information component 1508 may provide a CTS message to the transmission component for transmission to the eNB 1550. The CTS message may include the MIMO configuration determined at the MIMO configuration information component 1208. The UE 1250 may respond to the apparatus 1202 with a CTS message, which may include the MIMO configuration information.

The apparatus may include additional components that perform each of the blocks of the algorithm in the aforementioned flowcharts of FIGS. 10 and 14. As such, each block in the aforementioned flowcharts of FIGS. 10 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
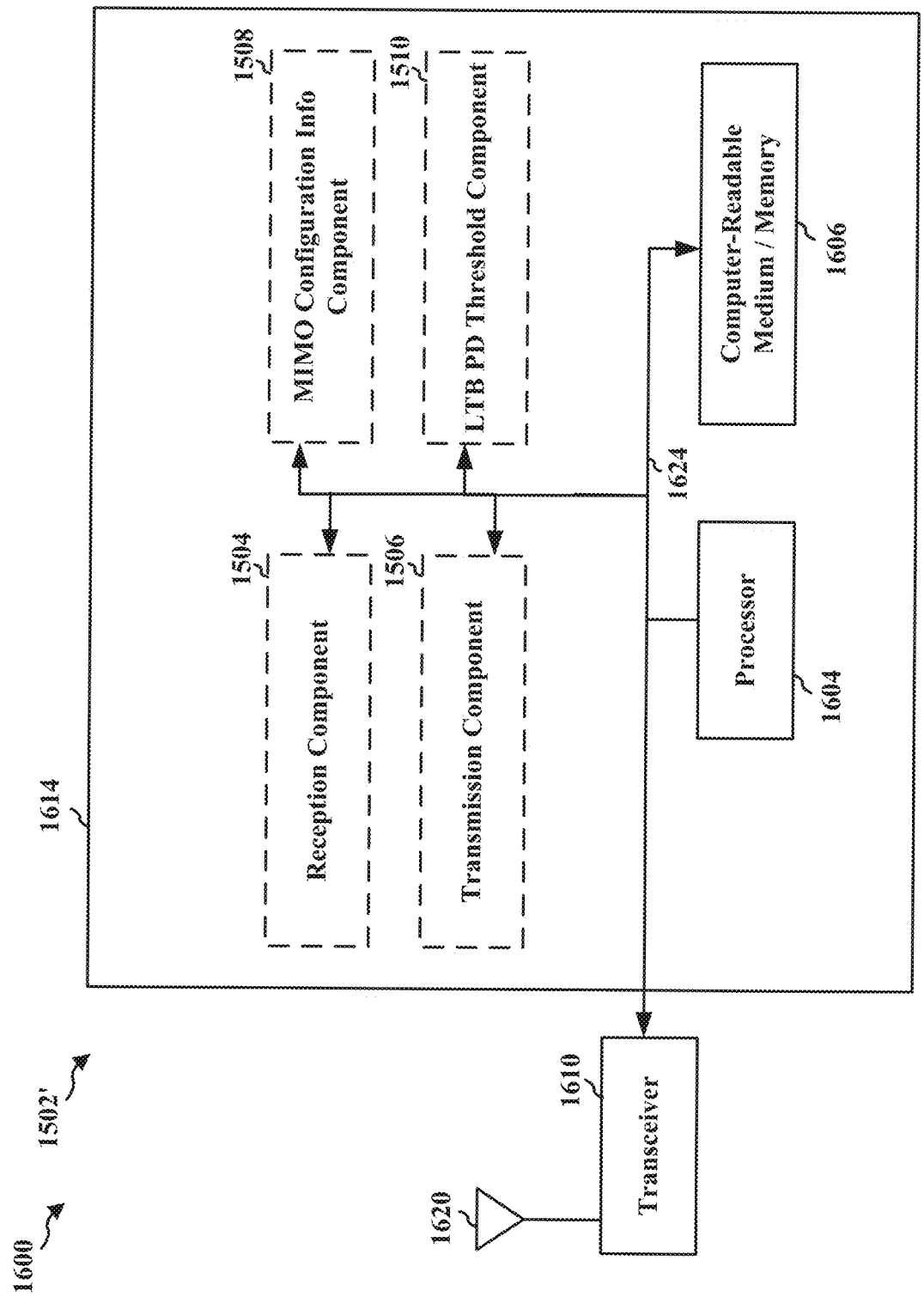
FIG. 16 is a diagram illustrating an example of a hardware implementation for an apparatus, according to aspects of the present disclosure.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, and 1510, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1306 may also be used for storing data that is manipulated by the processor 1604 when executing software. The processing system 1614 further includes at least one of the components 1504, 1506, 1508, and 1510. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 316, the RX processor 370, and the controller/processor 375.

In one configuration, the apparatus 1502/1502' for wireless communication includes means for receiving from a transmitting network device a first broadcast message over a wireless transmission medium, means for determining multiple input multiple output (MIMO) configuration information of the transmitting network device from the received broadcast message, means for transmitting a second broadcast message to the transmitting network device, the second broadcast message including the MIMO configuration information, if the MIMO configuration information is available from the received first broadcast message, and means for receiving transmission data from the transmitting network device after transmitting the second broadcast message. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

An apparatus for wireless communication at a transmitting network device in a listen-before-talk (LBT) session, comprising: means for determining multiple input multiple output (MIMO) configuration information for the transmitting network device; means for performing a contention-based access protocol procedure to determine whether a wireless transmission channel is clear for transmitting data to a target network device, based on the determined MIMO configuration information; and means for transmitting a broadcast message, prior to transmitting data to the target network device, the broadcast message including at least part of the MIMO configuration information, when the contention-based access protocol procedure indicates that the wireless transmission channel is clear.

For the above apparatus the MIMO configuration information is embedded in a header of an existing broadcast message and the wireless transmission channel is one of a licensed frequency band, an unlicensed frequency band, and a shared frequency band for an asynchronous wireless system.

The above apparatus is further configured to determine the MIMO configuration information by determining for the LBT session at least, whether the MIMO configuration information is available; and if the MIMO configuration information is available, at least one of a MIMO rank, a number of transmit antennas, a number of receive antennas, a transmit beamforming (TxBF) matrix; or a receive beamforming (RxBF) matrix.

The above apparatus further comprises means for transmitting the broadcast message, including full MIMO configuration information in the broadcast message, when transmission data for the target network device at the transmitting network device is of a high priority.

The above apparatus further comprises means for receiving a clear to send (CTS) message from the target network device; and means for transmitting the data to the target network device, wherein the transmitting network device comprises one of a user equipment, a base station, a wireless network node, and a relay node.

The above method further comprises receiving transmission data from the transmitting network device after transmitting the second broadcast message. The first broadcast message includes full MIMO configuration information, when the transmission data is of a high priority. The first MIMO configuration information may be same as or different from the second MIMO configuration information. The target network device comprises one of a user equipment, a base station, and a wireless network node, and a relay node.

An apparatus for wireless communication at a target network device in a listen-before-talk (LBT) session, comprising: means for receiving from a transmitting network device a first broadcast message over a wireless transmission channel; means for determining first multiple input multiple output (MIMO) configuration information of the transmitting network device from the received first broadcast message; means for performing a contention-based access protocol to determine whether the wireless transmission channel is clear for transmitting a signal to the transmitting network device, based on the determined MIMO configuration information; and means for transmitting a second broadcast message to the transmitting network device, the second broadcast message including second MIMO configuration information based on the determined first MIMO configuration information, when the first MIMO configuration information is available from the received first broadcast message and when the CCA or eCCA procedure indicates that the wireless transmission channel is clear for transmission.

For the above apparatus the contention-based access protocol comprises a clear channel assessment (CCA) or an enhanced CCA (eCCA) protocol and the first broadcast message is a request to send (RTS) message for the LBT session. For the above apparatus, the second broadcast message is a clear to send (CTS) message for the LBT session. The wireless transmission channel is one of a licensed frequency band, an unlicensed frequency band, and a shared frequency band for an asynchronous wireless system. The means for determining of the first MIMO configuration information further comprises determining for the LBT session at least: whether the first MIMO configuration information is available in the received first broadcast message; and if the first MIMO configuration information is available, at least one of: a MIMO rank; a number of transmit antennas; a number of receive antennas; a transmit beamforming (TxBF) matrix; and a receive beamforming (RxBF) matrix.

The above apparatus further comprises means for performing the CCA or eCCA procedure further comprises adaptive performing of a spatial LBT procedure, based on the first MIMO configuration information. The adaptive performing of the spatial LBT procedure further comprises: computing an effective interference measurement based at least in part on the TxBF matrix and the RxBF matrix of the first MIMO configuration information when the first MIMO configuration information is available; comparing the effective interference measurement with a default LBT power detection (PD) threshold to determine if the wireless transmission channel is clear; and computing an omni-directional preamble based interference from a second transmitting network device to the target network device in addition to the effective interference measurement when the first MIMO configuration information is available.

For the above apparatus, the adaptive performing of the spatial LBT procedure further comprises one or more of: using a larger LBT PD threshold when only a part of the first MIMO configuration information is available that does not allow the target network device to estimate an effective interference level but sufficient to determine that an ongoing or incoming data reception is of a rank lower than a full rank of the target network device; using a larger LBT PD threshold when a receive power is lower than needed for a full rank of the target network device for an ongoing or an incoming data reception; using a larger LBT PD threshold when a lower MIMO rank is determined from a blind signal processing on an ongoing or incoming data reception while rank information is not present in the first MIMO configuration information; using a larger LBT PD threshold when a low MIMO rank is determined from a static MIMO configuration indicated in the first MIMO configuration information without listening to the wireless transmission channel or when a MIMO configuration of the target network device is asymmetric; using an omni-directional preamble based interference measurement for LBT PD threshold when the first MIMO configuration information is not available.

An apparatus for wireless communication at a target network device in a listen-before-talk (LBT) session, comprises: a memory; and at least one processor coupled to the memory and configured to: receive from a transmitting network device a first broadcast message over a wireless transmission channel; determine first multiple input multiple output (MIMO) configuration information of the transmitting network device from the received first broadcast message; perform a contention-based access protocol to determine whether the wireless transmission channel is clear for transmitting a signal to the transmitting network device, based on the determined MIMO configuration information; and transmit a second broadcast message to the transmitting network device, the second broadcast message including second MIMO configuration information based on the determined first MIMO configuration information, when the first MIMO configuration information is available from the received first broadcast message and when the CCA or eCCA procedure indicates that the wireless transmission channel is clear for transmission. The contention-based access protocol comprises a clear channel assessment (CCA) or an enhanced CCA (eCCA) protocol and the first broadcast message is a request to send (RTS) message for the LBT session.

For the above apparatus, the second broadcast message is a clear to send (CTS) message for the LBT session; the wireless transmission channel is one of a licensed frequency band, an unlicensed frequency band, and a shared frequency band for an asynchronous wireless system. Determining the first MIMO configuration information comprises determining for the LBT session at least: whether the first MIMO configuration information is available in the received first broadcast message; and if the first MIMO configuration information is available, at least one of: a MIMO rank; a number of transmit antennas; a number of receive antennas; a transmit beamforming (TxBF) matrix; or a receive beamforming (RxBF) matrix.

For the above apparatus, the adaptive performing of the spatial LBT procedure further comprises one or more of: computing an effective interference measurement based at least in part on the TxBF matrix and the RxBF matrix of the first MIMO configuration information when the first MIMO configuration information is available; comparing the effective interference measurement with a default LBT power detection (PD) threshold to determine if the wireless transmission channel is clear; computing an omni-directional preamble based interference from a second transmitting network device to the target network device in addition to the effective interference measurement when the first MIMO configuration information is available; and using a larger LBT PD threshold when only a part of the first MIMO configuration information is available that does not allow the target network device to estimate the effective interference measurement but sufficient to determine that an ongoing or incoming data reception is of a rank lower than a full rank of the target network device.

For the above apparatus, the adaptive performing of the spatial LBT procedure further comprises one or more of: using a larger LBT PD threshold when a receive power is lower than needed for a full rank of the target network device for an ongoing or an incoming data reception; using a larger LBT PD threshold when a lower MIMO rank is determined from a blind signal processing on an ongoing or incoming data reception while rank information is not present in the first MIMO configuration information; and using a larger LBT PD threshold when a low MIMO rank is determined from a static MIMO configuration indicated in the first MIMO configuration information without listening to the wireless transmission channel or when a MIMO configuration of the target network device is asymmetric; using an omni-directional preamble based interference measurement for LBT PD threshold when the first MIMO configuration information is not available; receive transmission data from the transmitting network device after transmitting the second broadcast message.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a transmitting network device in a listen-before-talk (LBT) session, comprising:
    determining multiple input multiple output (MIMO) configuration information for the transmitting network device, wherein the determining comprises determining for the LBT session at least: whether the MIMO configuration information is available; and
    if the MIMO configuration information is available, at least one of: a MIMO rank, a number of transmit antennas, a number of receive antennas, a transmit beamforming (TxBF) matrix, or a receive beamforming (RxBF) matrix;
    performing a contention-based access protocol procedure to determine whether a wireless transmission channel is clear for transmitting data to a target network device, based on the determined MIMO configuration information, wherein performing the contention-based access protocol procedure comprises adaptive performing of a spatial LBT procedure, based on the MIMO configuration information; and
    transmitting a broadcast message, prior to transmitting data to the target network device, the broadcast message including at least part of the MIMO configuration information, when the contention-based access protocol procedure indicates that the wireless transmission channel is clear.

2. The method of claim 1, wherein the contention-based access protocol procedure comprises a clear channel assessment (CCA) procedure or an enhanced CCA (eCCA) protocol procedure and the broadcast message is a request to send (RTS) message for the LBT session.

3. The method of claim 1, wherein the MIMO configuration information is embedded in a header of an existing broadcast message.

4. The method of claim 1, wherein the wireless transmission channel is one of a licensed frequency band, an unlicensed frequency band, or a shared frequency band for an asynchronous wireless system.

5. The method of claim 1, wherein the adaptive performing of the spatial LBT procedure further comprises:
computing an effective interference measurement based at least in part on the TxBF matrix and the RxBF matrix of the MIMO configuration information; and
comparing the effective interference measurement with a default LBT power detection (PD) threshold to determine if the wireless transmission channel is clear.

6. The method of claim 5, wherein the adaptive performing of the spatial LBT procedure further comprises:
computing an omni-directional preamble-based interference from a second transmitting network device to the transmitting network device in addition to the effective interference measurement.

7. The method of claim 1, wherein the adaptive performing of the spatial LBT procedure further comprises:
using a larger LBT PD threshold for the transmitting network device when only a part of the MIMO configuration information is available that does not allow the transmitting network device to estimate an effective interference level but sufficient to determine that an ongoing or incoming data transmission is of a rank lower than a full rank of the transmitting network device.

8. The method of claim 7, wherein the adaptive performing of the spatial LBT procedure further comprises:
using a larger LBT PD threshold when a transmit power is lower than needed for the full rank of the transmitting network device for an ongoing or an incoming data transmission and when the MIMO configuration information is not available.

9. The method of claim 1, wherein the adaptive performing of the spatial LBT procedure further comprises:
using a larger LBT PD threshold when a lower MIMO rank is determined from a blind signal processing on an ongoing or incoming data transmission while rank information is not present in the MIMO configuration information.

10. The method of claim 1, wherein the adaptive performing of the spatial LBT procedure further comprises:
using a larger LBT PD threshold when a low MIMO rank is determined from a static MIMO configuration without listening to the wireless transmission channel or when a MIMO configuration of the transmitting network device is asymmetric.

11. The method of claim 1, wherein the adaptive performing of the spatial LBT procedure further comprises:
using an omni-directional preamble-based interference measurement for LBT PD threshold when the MIMO configuration information is not available.

12. An apparatus for wireless communication at a transmitting network device in a listen-before-talk (LBT) session, comprising:
means for determining multiple input multiple output (MIMO) configuration information for the transmitting network device;
means for performing a contention-based access protocol procedure to determine whether a wireless transmission channel is clear for transmitting data to a target network device, based on the determined MIMO configuration information, wherein the content-based access protocol procedure comprises a clear channel assessment (CCA) procedure or an enhanced CCA (eCCA) protocol procedure and the broadcast message comprises a request to send (RTS) message for the LBT session and wherein the means to perform the CCA or eCCA procedure comprises adaptive performing of a spatial LBT procedure, based on the MIMO configuration information; and
means for transmitting a broadcast message, prior to transmitting data to the target network device, the broadcast message including at least part of the MIMO configuration information, when the contention-based access protocol procedure indicates that the wireless transmission channel is clear.

13. The apparatus of claim 12, wherein the adaptive performing of the spatial LBT procedure further comprises:
computing an effective interference measurement based at least in part on the TxBF matrix and the RxBF matrix of the MIMO configuration information; and
comparing the effective interference measurement with a default LBT power detection (PD) threshold to determine if the wireless transmission channel is clear.

14. The apparatus of claim 13, wherein the adaptive performing of the spatial LBT procedure further comprises:
computing an omni-directional preamble-based interference from a second transmitting network device to the transmitting network device in addition to the effective interference measurement when the MIMO configuration information is available.

15. The apparatus of claim 12, wherein the adaptive performing of the spatial LBT procedure further comprises:
using a larger LBT PD threshold for the transmitting network device when only a part of the MIMO configuration information is available that does not allow the transmitting network device to estimate an effective interference level but sufficient to determine that an ongoing or incoming data transmission is of a rank lower than a full rank of the transmitting network device.

16. The apparatus of claim 15, wherein the adaptive performing of the spatial LBT procedure further comprises:
using a larger LBT PD threshold when a transmit power is lower than needed for the full rank of the transmitting network device for an ongoing or an incoming data transmission and when the MIMO configuration is not available.

17. The apparatus of claim 12, wherein the adaptive performing of the spatial LBT procedure further comprises one of:
using a larger LBT PD threshold when a lower MIMO rank is determined from a blind signal processing on an ongoing or incoming data transmission while rank information is not present in the MIMO configuration information; and
using a larger LBT PD threshold when a low MIMO rank is determined from a static MIMO configuration without listening to the wireless transmission channel or when a MIMO configuration of the transmitting network device is asymmetric.

18. The apparatus of claim 12, wherein the adaptive performing of the spatial LBT procedure further comprises:
using an omni-directional preamble-based interference measurement for LBT PD threshold when the MIMO configuration information is not available.

19. An apparatus for wireless communication at a transmitting network device, comprising:
a memory; and
at least one processor coupled to the memory and configured to:

to determine multiple input multiple output (MIMO) configuration information for the transmitting network device;

to perform a content-based access protocol procedure to determine whether a wireless transmission channel is clear for transmitting data to a target network device, based on the determined MIMO configuration information, wherein the contention-based access protocol procedure comprises a clear channel assessment (CCA) protocol procedure or an enhanced CCA (eCCA) protocol procedure and the broadcast message is a request to send (RTS) message for the LBT session and wherein means to perform the CCA or eCCA procedure comprises adaptive performing of a spatial LBT procedure, based on the MIMO configuration information; and to transmit a broadcast message, prior to transmitting data to the target network device, the broadcast message including at least part of the MIMO configuration information, when the content-based access protocol procedure indicates that the wireless transmission channel is clear.

20. A method for wireless communication at a target network device in a listen-before-talk (LBT) session, comprising:

receiving from a transmitting network device a first broadcast message over a wireless transmission channel;

determining first multiple input multiple output (MIMO) configuration information of the transmitting network device from the received first broadcast message;

performing a contention-based access protocol procedure to determine whether the wireless transmission channel is clear for transmitting a signal to the transmitting network device, based on the determined MIMO configuration information, wherein the contention-based access protocol procedure comprises a clear channel assessment (CCA) or an enhanced CCA (eCCA) protocol and the first broadcast message is a request to send (RTS) message for the LBT session and wherein the performing of the CCA or eCCA procedure further comprises adaptive performing of a spatial LBT procedure, based on the first MIMO configuration information; and transmitting a second broadcast message to the transmitting network device, the second broadcast message including second MIMO configuration information based on the determined first MIMO configuration information, when the first MIMO configuration information is available from the received first broadcast message and when the contention-based access protocol procedure indicates that the wireless transmission channel is clear for transmission.

21. The method of claim 20, wherein the adaptive performing of the spatial LBT procedure further comprises one or more of:

computing an effective interference measurement based at least in part on the TxBF matrix and the RxBF matrix of the first MIMO configuration information when the first MIMO configuration information is available;

comparing the effective interference measurement with a default LBT power detection (PD) threshold to determine if the wireless transmission channel is clear;

computing an omni-directional preamble-based interference from a second transmitting network device to the target network device in addition to the effective interference measurement when the first MIMO configuration information is available;

using a larger LBT PD threshold when only a part of the first MIMO configuration information is available that does not allow the target network device to estimate an effective interference level but sufficient to determine that an ongoing or incoming data reception is of a rank lower than a full rank of the target network device.

22. The method of claim 20, wherein the adaptive performing of the spatial LBT procedure further comprises one or more of:

using a larger LBT PD threshold when a receive power is lower than needed for a full rank of the target network device for an ongoing or an incoming data reception;

using a larger LBT PD threshold when a lower MIMO rank is determined from a blind signal processing on an ongoing or incoming data reception while rank information is not present in the first MIMO configuration information;

using a larger LBT PD threshold when a low MIMO rank is determined from a static MIMO configuration indicated in the first MIMO configuration information without listening to the wireless transmission channel or when a MIMO configuration of the target network device is asymmetric; and using an omni-directional preamble-based interference measurement for LBT PD threshold when the first MIMO configuration information is not available.

\* \* \* \* \*